US012607180B2

(12) United States Patent
Gagne

(10) Patent No.: US 12,607,180 B2
(45) Date of Patent: Apr. 21, 2026

(54) PUMP AND COMBINATION PUMP/MIXER DEVICE

(71) Applicant: ALPHINITY USA, INC., Carson City, NV (US)

(72) Inventor: Michael C. Gagne, Carson City, NV (US)

(73) Assignee: ALPHINITY USA, INC., Carson City, NV (US)

(*) Notice: Subject to any disclaimer, the term of this patent is extended or adjusted under 35 U.S.C. 154(b) by 667 days.

(21) Appl. No.: 17/795,862

(22) PCT Filed: Jan. 29, 2021

(86) PCT No.: PCT/US2021/015917
§ 371 (c)(1),
(2) Date: Jul. 27, 2022

(87) PCT Pub. No.: WO2021/158448
PCT Pub. Date: Aug. 12, 2021

(65) Prior Publication Data

US 2023/0358223 A1 Nov. 9, 2023

Related U.S. Application Data

(60) Provisional application No. 62/970,103, filed on Feb. 4, 2020.

(51) Int. Cl.

| | |
|---|---|
| ***F04B 43/02*** | (2006.01) |
| ***B01F 25/60*** | (2022.01) |
| ***F04B 43/04*** | (2006.01) |

(52) U.S. Cl.
CPC ............ *F04B 43/026* (2013.01); *B01F 25/60* (2022.01); *F04B 43/04* (2013.01)

(58) Field of Classification Search
CPC ........ F04B 13/02; F04B 43/02; F04B 43/021; F04B 43/025; F04B 43/026; F04B 43/12;
(Continued)

(56) References Cited

U.S. PATENT DOCUMENTS 2,461,121 A 2/1949 Markham
4,153,391 A 5/1979 Hartley
(Continued)

FOREIGN PATENT DOCUMENTS

CN 106110919 11/2016
CN 207221838 4/2018
(Continued)

OTHER PUBLICATIONS

Quattroflow-150 Series 4-Piston Diaphragm Pump, QuattroFlow Fluid Systems, (2012) (59 pages).
(Continued)

*Primary Examiner* — Essama Omgba
*Assistant Examiner* — Chirag Jariwala
(74) *Attorney, Agent, or Firm* — VISTA IP LAW GROUP LLP

(57) ABSTRACT

A pump or combination pump/mixer device is disclosed. The pump or pump/mixer uses moving diaphragms in combination with check valves to pump and/or mix fluid. A main inlet is located at the top of the pump and is fed by a vessel or container that contains fluid. The fluid, in response to the moving diaphragms, passes through an outer chamber into a plurality of lower chambers and then into a central chamber where the fluid then exits via one or more outlets. A series of check-valves are used to ensure one-way flow of fluid through the chambers. The drive shaft of a motor or drive unit drives a nutating disk or wobble plate that actuates the diaphragms to drive fluid through the device. In the pump/mixer configuration, one or more additional inlets are pro-
(Continued)

vided to input additional fluids into the device for mixing within the inside of the pump/mixer.

16 Claims, 22 Drawing Sheets

(58) Field of Classification Search
CPC .... F04B 43/1207; F04B 43/04; F04B 43/043; F04B 43/047; F04B 43/08; F04B 43/085; F04B 43/10; B01F 25/60
See application file for complete search history.

(56) References Cited

U.S. PATENT DOCUMENTS

| | | | | |
|---|---|---|---|---|
| 4,486,151 | A | 12/1984 | Korhonen-Wesala | |
| 5,476,367 | A | 12/1995 | Zimmermann et al. | |
| 6,007,314 | A | 12/1999 | Nelson, II | |
| 6,082,381 | A | 7/2000 | Kamikawa et al. | |
| 7,789,012 | B2 | 9/2010 | Marcilese et al. | |
| 10,451,451 | B2 | 10/2019 | Gagne et al. | |
| 10,502,650 | B2 | 12/2019 | Gagne | |
| 11,274,954 | B2 | 3/2022 | Gagne et al. | |
| 11,331,248 | B2 * | 5/2022 | Gagne | C12M 29/10 |
| 11,666,508 | B2 * | 6/2023 | Gagne | C12M 29/00 435/289.1 |
| 11,815,075 | B2 | 11/2023 | Lundin et al. | |
| 12,048,671 | B2 * | 7/2024 | Gagne | B01F 27/91 |
| 2006/0237066 | A1 | 10/2006 | Gagne et al. | |
| 2006/0255309 | A1 | 11/2006 | Marcilese et al. | |
| 2009/0078905 | A1 | 3/2009 | Marcilese et al. | |
| 2013/0034452 | A1 | 2/2013 | Itahara | |
| 2013/0233390 | A1 | 9/2013 | Jaeschke et al. | |
| 2017/0135532 | A1 | 5/2017 | Ciavarella et al. | |
| 2017/0143172 | A1 * | 5/2017 | Ciavarella | F04B 23/04 |
| 2017/0152844 | A1 * | 6/2017 | Kingsford | B65G 53/28 |
| 2017/0290470 | A1 | 10/2017 | Ciavarella et al. | |
| 2017/0335832 | A1 | 11/2017 | Olovsson et al. | |
| 2019/0101154 | A1 | 4/2019 | Gagne et al. | |
| 2019/0367859 | A1 * | 12/2019 | Gagne | C12M 23/46 |
| 2020/0088337 | A1 | 3/2020 | Gagne | |
| 2021/0033203 | A1 | 2/2021 | Gagne et al. | |
| 2021/0039019 | A1 * | 2/2021 | Bergstedt | B01D 19/0042 |
| 2022/0196162 | A1 | 6/2022 | Gagne et al. | |
| 2022/0233402 | A1 * | 7/2022 | Gagne | F04D 29/40 |
| 2023/0293388 | A1 * | 9/2023 | Gagne | B01F 35/513 435/289.1 |
| 2024/0342055 | A1 * | 10/2024 | Gagne | C12M 23/14 |

FOREIGN PATENT DOCUMENTS

| | | | | |
|---|---|---|---|---|
| CN | 108661892 | | 10/2018 | |
| CN | 108661892 | A | 10/2018 | |
| CN | 209654219 | U | 11/2019 | |
| DE | 202006020237 | U1 | 3/2008 | |
| DE | 102008035592 | A1 | 2/2010 | |
| DE | 102010031860 | B4 | 3/2016 | |
| DE | 202017004425 | U1 | 10/2017 | |
| EP | 3447290 | A1 | 2/2019 | |
| JP | 58-15779 | | 1/1983 | |
| JP | H10-502716 | A | 3/1998 | |
| JP | 2008-002454 | | 1/2008 | |
| JP | 2008002454 | A | 1/2008 | |
| JP | 2012-017569 | | 6/2012 | |
| JP | 2012-117492 | A | 6/2012 | |
| JP | 20121-07569 | A | 6/2012 | |
| JP | 2012117492 | | 6/2012 | |
| JP | 2013-36349 | A | 2/2013 | |
| JP | 2013-36350 | A | 2/2013 | |
| JP | 2019-502849 | | 1/2019 | |
| JP | 2019502849 | A | 1/2019 | |
| JP | 2019-512281 | A | 5/2019 | |
| TW | 200904520 | | 2/2009 | |
| WO | WO 2007/135779 | A1 | 11/2007 | |
| WO | WO 2017/083802 | A1 | 5/2017 | |
| WO | WO 2017/139727 | | 8/2017 | |
| WO | WO-2018144391 | A1 * | 8/2018 | C12M 29/00 |
| WO | WO 2020/182921 | A1 | 9/2020 | |
| WO | WO 2021/158448 | A1 | 8/2021 | |
| WO | WO 2022/066668 | A1 | 3/2022 | |

OTHER PUBLICATIONS

Quattroflow 4400S Quaternary Pump Stainless Steel 4-Piston-Diaphragm Pump (Multiple-Use), QuattroFlow Fluid Systems, (2017) (19 pages).
The extended European search report dated Jun. 6, 2023 for European Patent Appl. 21751085.8, (5 pages).
Communication pursuant to Rules 70(2) and 70a(2) EPC dated Jun. 23, 2023 for European Patent Appl. 21751085.8, (1 page).
Response to extended European search report dated Jan. 3, 2024 for European Patent Appl. 21751085.8, (50 pages).
PCT International Search Report for PCT/US2021/015917, Applicant: Alphinity USA, Inc., Form PCT/ISA/210 and 220, dated Apr. 14, 2021 (4 pages).
PCT Written Opinion of the International Search Authority for PCT/US2021/015917, Applicant: Alphinity USA, Inc., Form PCT/ISA/237, dated Apr. 14, 2021 (8 pages).
PCT International Preliminary Report on Patentability (Chapter I of the Patent Cooperation Treaty) for PCT/US2021/015917, Applicant: The Regents of the University of California, Form PCT/IB/326 and 373, dated Aug. 18, 2022 (10 pages).
First Office Action dated Feb. 4, 2025 for Japanese Patent Appl No. 2022-547065, (16 pages).
First Office Action dated Nov. 29, 2024 for Taiwanese Patent Application No. 110103907, (14 pages).
Response to Office Action dated Mar. 3, 2025 for Taiwanese Patent Application No. 110103907,claims translations only (79 pages).
Response to First Office Action dated May 7, 2025 for Japanese Patent Appl No. 2022-547065, translations for current claims only (15 pages).
Second Office Action dated Aug. 26, 2025 for Japanese Patent Application No. 2022-547065, (16 pages).
Response to Second Office Action dated Nov. 13, 2025 for Japanese Patent Application No. 2022-547065, English Translations for Claims only, (15 pages).
Response to the Office Action dated Aug. 29, 2025 for Korean Patent Application No. 10-2022-7030459, (27 pages).
Notice of Allowance and Issue Fee dated May 9, 2025 for TW patent application No. 110103907, (3 pages).
Notice of Preliminary Rejection dated Jun. 30, 2025 for Korean Patent Application No. 10-2022-7030459, (20 pages).
Invitation to Respond to Written Opinion dated Nov. 27, 2025 for Singaporean Patent Application No. 1120225150R (14 pages).
Notice of Allowance dated Dec. 2, 2025 for Japanese Patent Application No. 2022-547065, English Translations for Claims only, (10 pages).

* cited by examiner

PUMP AND COMBINATION PUMP/MIXER DEVICE

RELATED APPLICATION

This Application is a U.S. National Stage filing under 35 U.S.C. § 371 of International Application No. PCT/US2021/015917, filed on Jan. 29, 2021, which claims priority to U.S. Provisional Patent Application No. 62/970,103 filed on Feb. 4, 2020, which are hereby incorporated by reference. Priority is claimed pursuant to 35 U.S.C. §§ 119, 371 and any other applicable statute.

TECHNICAL FIELD

The field of the invention generally relates to fluid-based systems and processes used in the manufacture, production, or capture of products. More specifically, the invention pertains to pumps and mixers used in bioprocess, pharmaceutical, biological, gene therapy applications or other hygienic process industries.

BACKGROUND

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, biomolecules, or complex combinations of these substances. They may even include living entities such as cells. For example, in order to produce biologics on a commercial scale, sophisticated and expensive equipment is needed. In both pharmaceutical and biologics, for example, various processes need to occur before the final product is obtained. In the case of biologics, mammalian cells may be grown in a container such as a growth chamber, reactor, bag or the like and nutrients may need to be carefully modulated into the unit holding the cells.

Importantly, biologic products produced by living cells or other organisms may need to be grown, filtered, extracted, concentrated, and ultimately collected from the growth container. Often reagents are loaded in growth containers and combined with other fluid stream(s) or inputs and require mixing. For example, buffer solutions are often added and mixed with other feed stream(s) during the manufacturing process. Waste products produced by cells typically have to be removed on a controlled basis from the growth container. Typically, desired biologic products produced by cells and/or waste products are pumped out of the container where growth occurs using a separate pumping device that is located downstream with respect container containing the cells. This pumped fluid that is removed from the growth chamber is typically subject to downstream processing such as separation or filtration.

As noted above, pumps are needed to move fluid and the contents thereof from one unit operation to another. In addition to actually moving fluid via pumps, mixing is often needed during one or more of these operations. For example, concentrated buffer solutions may be combined with a larger volume of water to make desired buffer concentrations that are used in one or more downstream processes. Typically, this happens in vessels or containers that contain a mixer therein.

Existing pumps are known that are used in biopharmaceutical operations. For example, the Quattroflow™ four-piston diaphragm pump is known that does not use any wetted rotating parts but instead uses four separately actuated diaphragms that are used to pump fluid. A typical problem with pumps is that they are generally connected to a vessel through various conduits. When incorporating pumps into fluid pathways, there is a need to design such systems to avoid problems caused by cavitation, vacuum or pulsed flow condition. Cavitation and non-steady flow conditions tend to lyse the delicate mammalian cells that are used in these manufacturing processes. Unfortunately, when pumps are placed downstream from containers or vessels, this inevitably tends to produce cavitation, vacuum, and problematic flow conditions that tend to kill or disrupt cells or results in low flow conditions. This causes pulsation at low flow rates and does not solve the main problem of getting fluid into the pump efficiently. There thus is a need for improved pump and mixer devices.

SUMMARY

In one embodiment, a pump is disclosed that operates using a plurality of diaphragms that are sequentially activated to pump fluid through the pump. The pump inlet is located at the top or upper region of the pump and receives fluid with the assistance of gravity. For example, the pump inlet may be coupled to a vessel or container (or integrated therein) that is configured to hold fluid therein. This fluid then enters the pump inlet from the top or upper region of the pump wherein the diaphragms are actuated to pump the fluid out of one or multiple outlets in the pump. In some embodiments, the pump may be mounted to the underside or bottom of a vessel or container using a flange or the like. In other embodiments, the pump may be directly manufactured or integrated with the vessel or container. The vessel or container may include both rigid vessels/containers and flexible vessels/containers (e.g., bags). Fluid in the vessel or container is fed into the inlet of the pump with gravitational assistance.

The pump may include an optional vortex breaker that is mounted within or adjacent to the inlet to the pump and prevents or inhibits the formation of vortices in the liquid fluid during operation of the pump. The pump, in one embodiment, includes an odd number of diaphragms. This may be one diaphragm or more. Examples include 1, 3, 5, 7, or 9 diaphragms (although more than one diaphragm is preferred). In other embodiments, an even number of diaphragms may be used (e.g., 2, 4, 6, 8, 10). The pump may include a single outlet or in a preferred embodiment a plurality of outlets. Each outlet of the pump may carry the same volume of fluid or the different outlets may carry varying or different amounts of fluid. The outlets may optionally include or incorporate valves that can be used (e.g., actuated) to selectively turn on/off various outlets. These many be manually operated valves or automatically actuated valves. The pump may be made from metal (e.g., stainless steel) or a polymer (e.g., polypropylene or polycarbonate, etc.) or combinations thereof. In some instances, the pump or components thereof may be reusable (after appropriate sterilization or other hygienic cleaning). In other embodiments, the pump or components thereof may be single-use or disposable.

In another embodiment, a pump/mixer device includes one or more additional fluid inlets so that the pump/mixer, in addition to pumping fluid, provides mixing functionality (referred to herein as a pump/mixer). The one or more additional fluid inlets enter the pump/mixer, in a preferred embodiment, from the side, although the invention is not so limited. Thus, a gravity fed inlet is provided as is described above (on the top or upper region of the pump/mixer device) along with one or more additional fluid inlets that is combined internally to mix the various input fluids within the pump/mixer itself which is then pumped out of the pump/mixer device. In this configuration, the pump/mixer may have a single outlet or a plurality of outlets. For example, in one particular embodiment, the pump/mixer may be secured to a vessel or container as disclosed herein. A first fluid or feedstock may be gravity fed into the pump/mixer via the inlet located on the top or upper region of the pump/mixer. This may include, for example, water or another diluent. The one or more additional inlets into the pump/mixer (e.g., connected via the side or other surface of the pump/mixer) may contain concentrated buffers (e.g., concentrated fluid). These separate inlets may be connected to separate pumped sources of concentrated buffers that can then be input to the pump/mixer to create the desired final concentration or makeup of buffer(s) that is mixed inside the pump/mixer and pumped out via one or more pump outlets. Of course, other fluids may be pumped into the various inlets of the pump/mixer.

In one embodiment, the fluid container or vessel that is secured to or fluidically connected to the pump or pump/mixer is a substantially rigid container. For example, the vessel may take the form of a tub, vat, barrel, bottle, tank (e.g., buffer tank), reactor, flask, or other container suitable for holding liquids. The fluid vessel may be made of any number of materials including metals, polymers, glass, and the like. In one preferred embodiment, the container or vessel is formed from a polymer or resin material and is made as a single-use device. Likewise, one or more portions of the pump that is directly or indirectly secured to the fluid container or vessel may also be made from a polymer or resin material which facilitates integration or bonding of the pump to the vessel. In some embodiments, both the pump and vessel are made from same material. In other embodiments, the pump and vessel are made from different materials.

In another embodiment, the fluid container or vessel is flexible container such as a bag. The bag is typically made from polymer or resin material(s) and may have any number of shapes and sizes. The flexible bag may be formed from multiple layers. The bag includes a pump that is directly or indirectly secured to a bottom surface of the bag. The bag and attached or integrated pump may be carried in a trolley, dolly, cradle, cart, holder, or other support container to hold the bag and pump in the proper orientation. In some embodiments, both the pump and bag are made from the same material. In other embodiments, the pump and bag are made from different materials.

The pump or pump/mixer device operates as a diaphragm or membrane pump. A diaphragm pump or membrane pump operates as positive displacement pump that uses moving diaphragm(s) in combination with check valves to pump fluid. In one embodiment, the drive shaft of a motor or drive unit may be used to drive a nutating disk or wobble plate to actuate the diaphragm membranes to drive fluid through the pump. For example, the nutating disk or wobble plate interfaces with a lower actuator disk or ring that sequentially actuates each of the diaphragms upon the wobbling motion of the nutating disk or wobble plate. Alternatively, servo motors or electronic/magnetic actuators may be used to sequentially actuate the diaphragm membrane(s) to achieve a similar pumping action. The pump or pump/mixer device includes an inlet port at the top or upper region that receives the incoming fluid that passes through the aperture in the container or vessel. The pump or pump/mixer may include one or a plurality of outlets. In addition, in the pump/mixer configuration, one or more additional inlets may be provided to input additional fluids into the pump/mixer for mixing.

In one particular embodiment, a pump/mixer device includes a main inlet located at the top or upper region of the pump/mixer, the main inlet configured to be secured to or integrated into a bottom of a vessel or container. An outer chamber is disposed in the pump/mixer and is fluidically connected to the main inlet. A plurality of lower chambers are disposed in the pump/mixer beneath the outer chamber and fluidically connected to the outer chamber by respective check valves interposed between the outer chamber and the plurality of lower chambers. A central chamber is disposed in the pump/mixer, wherein the central chamber is fluidically connected to the plurality of lower chambers with respective check valves interposed between the central chamber and the plurality of lower chambers. The pump/mixer has at least one outlet fluidically connected to the central chamber via respective outlet check valve(s). The pump/mixer has one or more additional inlets fluidically coupled to the central chamber via respective inlet check valve(s). A moveable diaphragm is disposed in each of the plurality of lower chambers, the moveable diaphragms interfacing with a respective actuating element driven by a wobble or nutating plate operatively coupled to a motor or drive unit, wherein actuation causes each of the moveable diaphragms to move in opposing directions (e.g., up and down). This movement pumps fluid through the pump/mixer.

In another embodiment, a method of operating the pump/mixer includes driving the motor or drive unit to actuate the wobble or nutating plate; inputting a first fluid from the vessel or container into the main inlet pump/mixer; inputting second or additional fluid(s) into the pump/mixer via the one or more additional inlets; mixing the first fluid and the second or additional fluid(s) in the central chamber of the pump/mixer; and outputting the mixed fluid via the at least one outlet.

In another embodiment, a pump device includes an inlet located at the top or upper region of the pump, the inlet configured to be secured to or integrated into a bottom of a vessel or container. An outer chamber is disposed in the pump and fluidically connected to the inlet. A plurality of lower chambers are disposed in the pump beneath the outer chamber and are fluidically connected to the outer chamber by respective check valves interposed between the outer chamber and the plurality of lower chambers. A central chamber is disposed in the pump, the central chamber is fluidically connected to the plurality of lower chambers with respective check valves interposed between the central chamber and the plurality of lower chambers. The pump device includes a plurality of outlets fluidically connected to the central chamber via respective outlet check valve(s). A moveable diaphragm is disposed in each of the plurality of lower chambers, the moveable diaphragms interfacing with a respective actuating element driven by a wobble or nutating plate operatively coupled to a motor or drive unit, wherein actuation causes each of the moveable diaphragms to move in opposing directions (e.g., up and down).

In another embodiment, a method of operating the pump device includes driving the motor or drive unit to actuate the wobble or nutating plate; inputting a fluid from the vessel or container into the pump; and outputting the fluid from the pump via the plurality of outlets.

DETAILED DESCRIPTION OF THE ILLUSTRATED EMBODIMENTS

Figure 1:
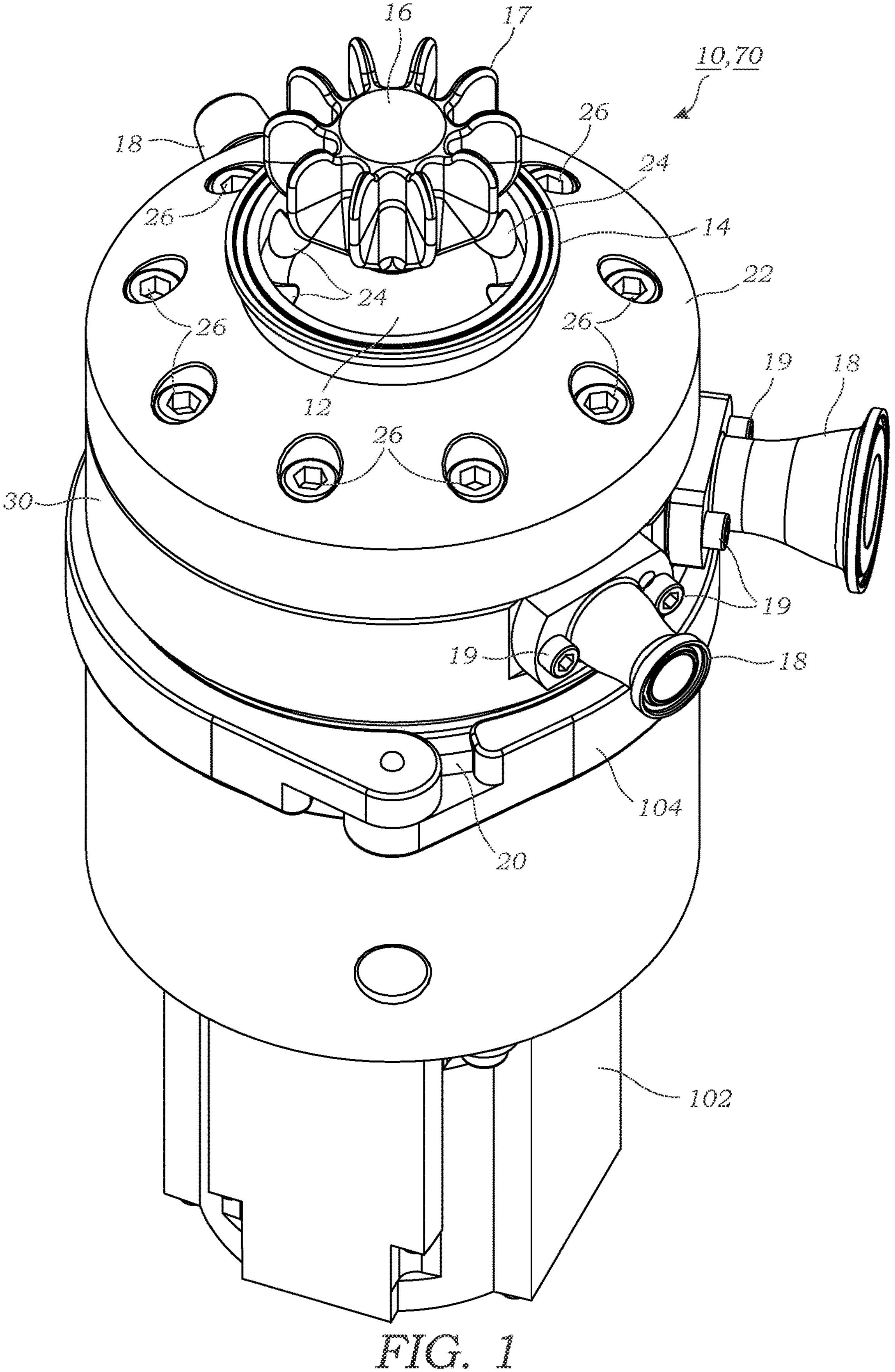
FIG. 1 illustrates a pump according to one embodiment. The pump includes a plurality of outlets. One or more of the outlets may be substituted with inlets (and inlet check valves) to create a pump/mixer as explained herein.

FIG. 1 illustrates one embodiment of a pump 10 or a pump/mixer 70. Whether the device is a pump 10 or a pump/mixer 70 depends on whether there are additional inlets 72, as explained herein, integrated into the device beyond the main inlet 12. The pump 10 or pump/mixer 70 includes a main inlet 12 that is located on the top or upper portion of the pump 10 as seen in FIG. 1. In this way, the main inlet 12 is at least partially gravity fed from the top as explained herein. The main inlet 12 may include a flanged end 14 (best seen in FIG. 3) that is coupled to the bottom of a vessel or container 100 as seen in FIGS. 13A, 13B, 14, 16B, 17B, 17C via a port or coupler 101 using a sanitary clamp 104. The port or coupler 101 may, in some embodiments, be integrated into the vessel or container 100. In other embodiments, the pump 10 or pump/mixer 70 may be directly integrated in or bonded to the vessel or container 100. For example, the pump 10 or pump/mixer 70 may be welded to or thermally/chemically bonded to or even integrated into the vessel or container 100. Regardless on the manner in which the pump 10 or pump/mixer 70 is connected to the vessel or container 100 the main inlet 12 is in fluid communication with the interior of the vessel or container 100.

The vessel or container 100 may include both rigid vessels/containers and flexible vessels/containers (e.g., bags). For example, the vessel or container 100 may take the form of a tub, vat, barrel, bottle, tank (e.g., buffer tank), reactor (e.g., bioreactor), flask, or other container suitable for holding fluids, liquids, or materials with fluid-like properties. The vessel or container 100 may be made of any number of materials including metals, polymers, glass, and the like. In one preferred embodiment, the vessel or container 100 is formed from a polymer or resin material and is made as a single-use device. Likewise, one or more portions of the pump 10 or pump/mixer 70 that is directly or indirectly secured to the fluid vessel or container 100 may also be made from a polymer or resin material which facilitates integration or bonding of the pump 10 to the vessel or container 100. In some embodiments, both the pump 10 (or pump/mixer 70) and vessel or container 100 are made from same material. In other embodiments, the pump 10 (or pump/mixer 70) and vessel or container 100 are made from different materials.

The vessel or container 100 may also be flexible such as a bag. The flexible vessel or container 100 (e.g., bag) is typically made from polymer or resin material(s) and may have any number of shapes and sizes. The flexible bag may be formed from multiple layers. The bag includes a pump 10 or pump/mixer 70 that is directly or indirectly secured to a bottom surface of the bag. The vessel or container 100 and attached or integrated pump 10 or pump/mixer 70 may be carried in a trolley, dolly, cradle, cart, holder, or other support container to hold the bag and pump 10 or pump/mixer 70 in the proper orientation. In some embodiments, both the pump 10 or pump/mixer 70 and bag are made from the same material. In other embodiments, the pump 10 or pump/mixer 70 and bag are made from different materials.

As noted above, the pump 10 or pump/mixer 70 may be secured to the bottom of the vessel or container 100 at port or coupler 101. For example, a sanitary clamp 104 (e.g., Tri-clamp) and O-ring 106 such as that illustrated in FIG. 8 may be used to clamp the flanged end 14 of the pump 10 to another flanged end of the port or coupler 101 located on the bottom of the vessel or container 100. In other embodiments, the main inlet 12 (or upper housing 22) is directly integrated in or manufactured in the vessel or container 100. For example, the main inlet 12 may be formed as an aperture or opening located in the bottom of the vessel or container 100. The main inlet 12 is, in one embodiment, a circular shaped inlet that has a diameter of about one inch or more (although various dimensions may be used). For example, the main inlet 12 may have a diameter of 3 inches, 4 inches, 5 inches, or more. As seen in FIG. 1, an optional vortex breaker 16 extends or projects from the main inlet 12 and includes a plurality of fins 17 formed about the periphery. The vortex breaker 16 extends into the bottom portion of the vessel or container 100. The vortex breaker 16, as its name implies, inhibits the formation or generation of a fluid vortex within the vessel or container 100 when the pump 10 or pump/mixer 70 is operating. In some embodiments of the pump 10 or pump/mixer 70 explained herein, the vortex breaker 16 may be omitted. This is seen, for example, in FIGS. 6A and 6B, 7, 9, 12, 16A, 16B, 17A-17C.

As seen in FIG. 1, the pump 10 or pump/mixer 70 includes one or more outlets 18. Each outlet 18 may carry the same volume of fluid or the different outlets 18 may carry varying or different amounts of fluid. The outlets 18 may optionally include, incorporate, or be connected to valves that can be used (e.g., actuated) to selectively turn on/off (or modulate flow through) the various outlets 18.

Figure 8:
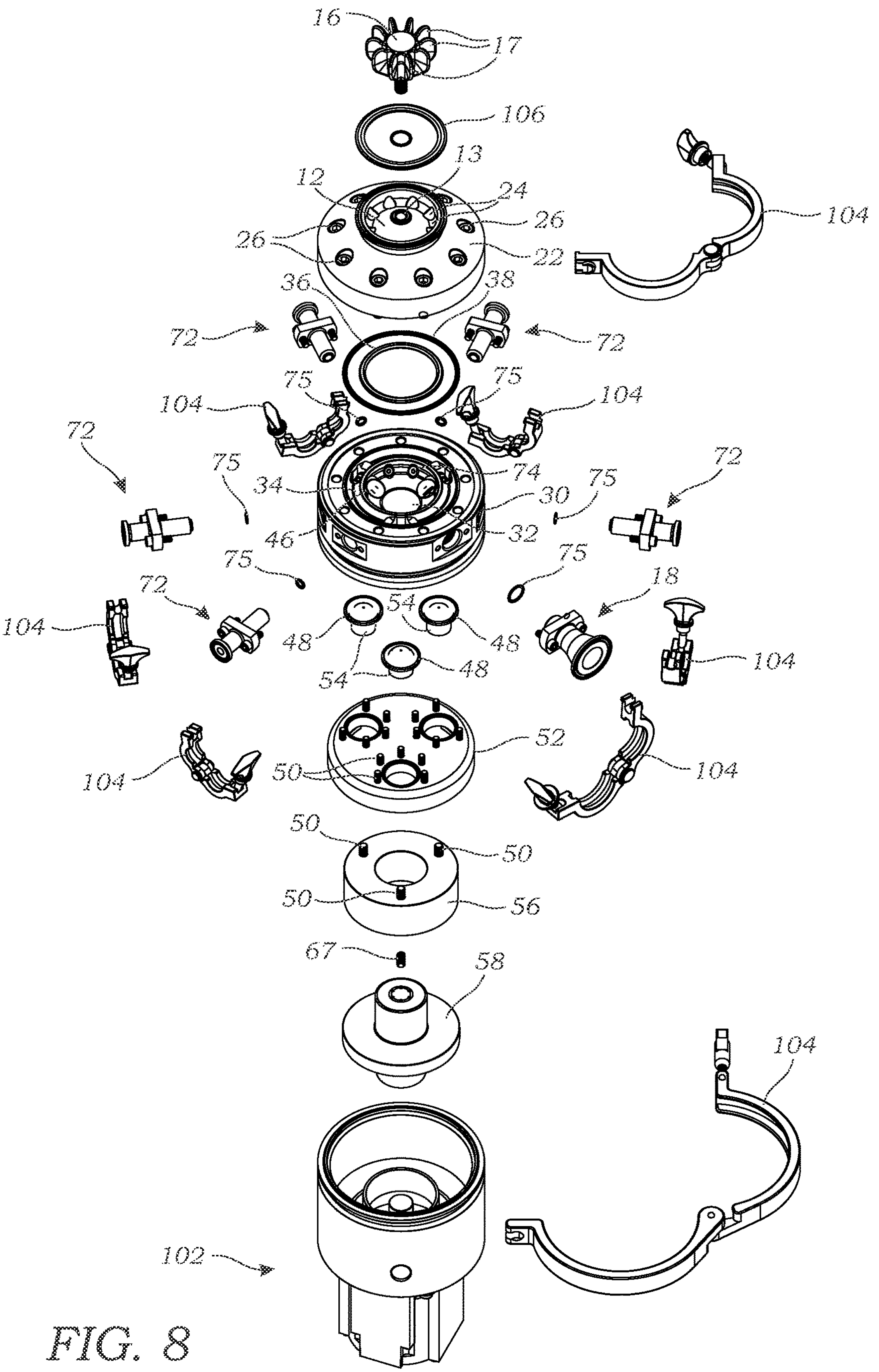
FIG. 8 illustrates an exploded view of the pump/mixer of FIG. 7.

In the embodiment of FIG. 1, a plurality of outlets 18 are illustrated (i.e., three (3) outlets 18). In this particular embodiment, the outlets 18 are different sized (e.g., ¾ inch outlet, 1-inch OD outlet, 1-inch ID outlet). Of course, it should be appreciated that different sizes and types of outlets (e.g., outlet connector types) may be used with the pump 10 or pump/mixer 70. In still another embodiment, all of the outlets 18 are of the same size and/or type. The outlets 18 may be removably secured to the body of the pump 10 via fasteners 19 (e.g., bolts) as illustrated. With reference to FIG. 8, o-rings 75 may be used to seal the outlets 18 to the central housing 30 of the pump 10. The bottom of the pump 10 or pump/mixer 70 may include a flange 20 (FIG. 12) that is used to connect the pump 10 or pump/mixer 70 to a motor or drive unit 102 (as seen in FIGS. 1, 6B, 7, 8, 12, 13A, 13B, 14, 16A, 16B, 17B and 17C) using a sanitary clamp 104. The motor or drive unit 102 may include, for example, a brushless direct drive motor (e.g., AKM1™ Series motor available from Kollmorgen).

Figure 2:
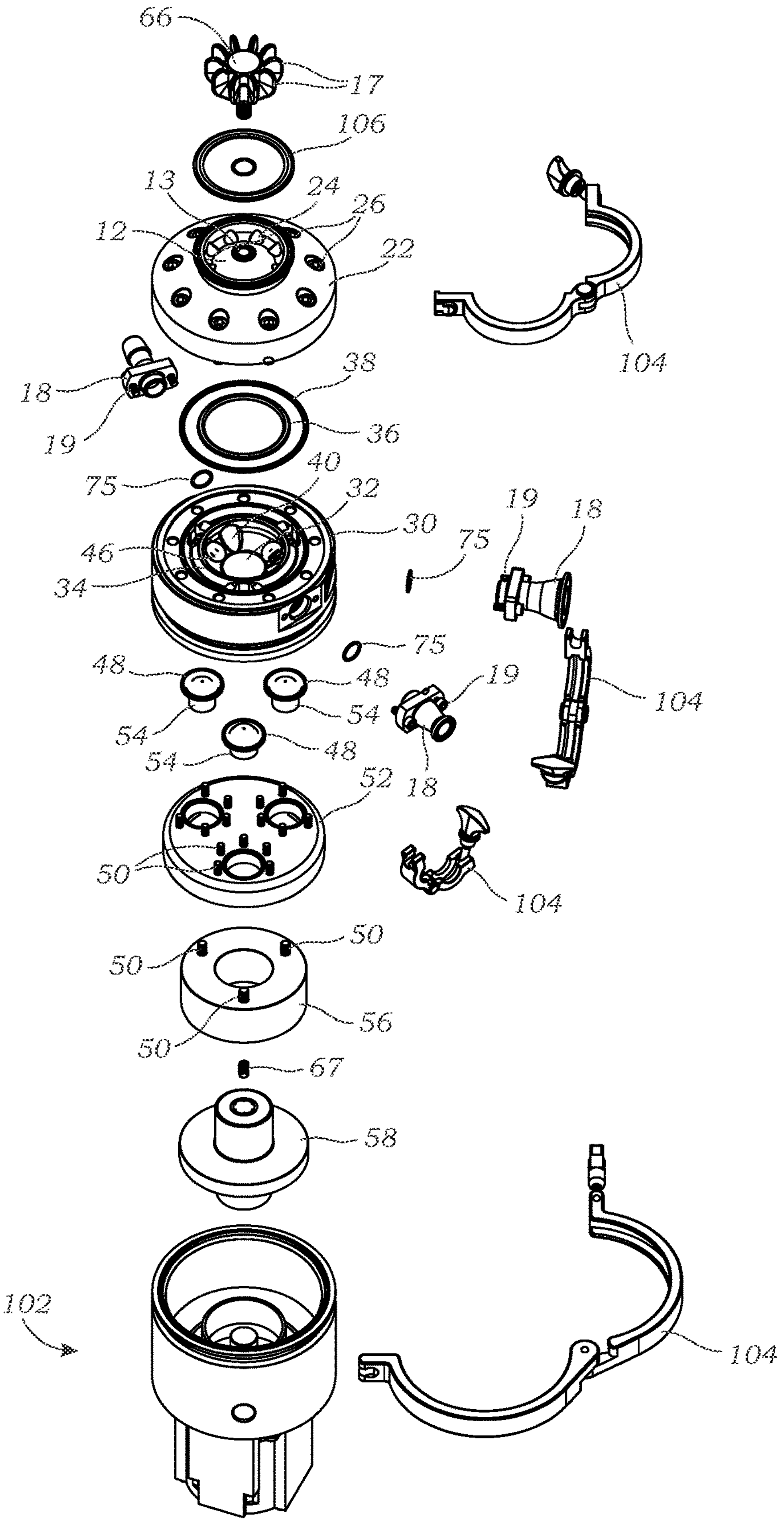
FIG. 2 illustrates an exploded view of a pump of the type illustrated in FIG. 1.

FIG. 2 illustrates an exploded view of the pump 10 or pump/mixer 70. Reference will be made to pump 10 for ease of reference and because there are no additional inlets making this embodiment a pump 10. As seen in FIG. 2, the pump 10 is formed from a number of assemblies or components that together create the pump 10. The pump 10 may be made from metal (e.g., stainless steel) or a polymer (e.g., polypropylene or polycarbonate, etc.) or combinations thereof. In some instances, the pump 10 or components thereof may be reusable (after appropriate sterilization or other hygienic cleaning). In other embodiments, the pump 10 or components thereof may be single-use or disposable. This may include, as explained below, the upper housing 22, central housing 30, or bottom housing or plate 52.

The pump 10 (or pump/mixer 70 when including one or more additional inlets 72 as explained herein) includes an upper housing 22 that includes the main inlet 12 as well as an optional mount 13 (e.g., threaded opening that receives a threaded post) for the optional vortex breaker 16. Of course, when the vortex breaker 16 is omitted there is no need for a mount 13. The main inlet 12 includes a central opening that leads to a plurality of passageways 24 that extend through the upper housing 22. The upper housing 22 further includes a series of fasteners 26 (e.g., bolts) that secure the upper housing 22 to the central housing 30. The central housing 30 includes a central chamber 32 that holds pressurized fluid generated by the pumping action of the pump 10 (or pump/mixer 70) just prior to exiting the pump 10 via the one or more outlets 18. The central housing 30 includes a separate outer chamber 34 that circumscribes the central chamber 32 as an annulus. A wall thus separates outer chamber 34 from the central chamber 32. Two separate O-rings 36, 38 are interposed between the upper housing 22 and the central housing 30 with the O-rings 36, 38 located on the wall and outer perimeter of the outer chamber 34. The inner O-ring 36 is more robust or thicker than the outer O-ring 38 (due to the exposure to the higher pressure from the central chamber 32).

Figure 3:
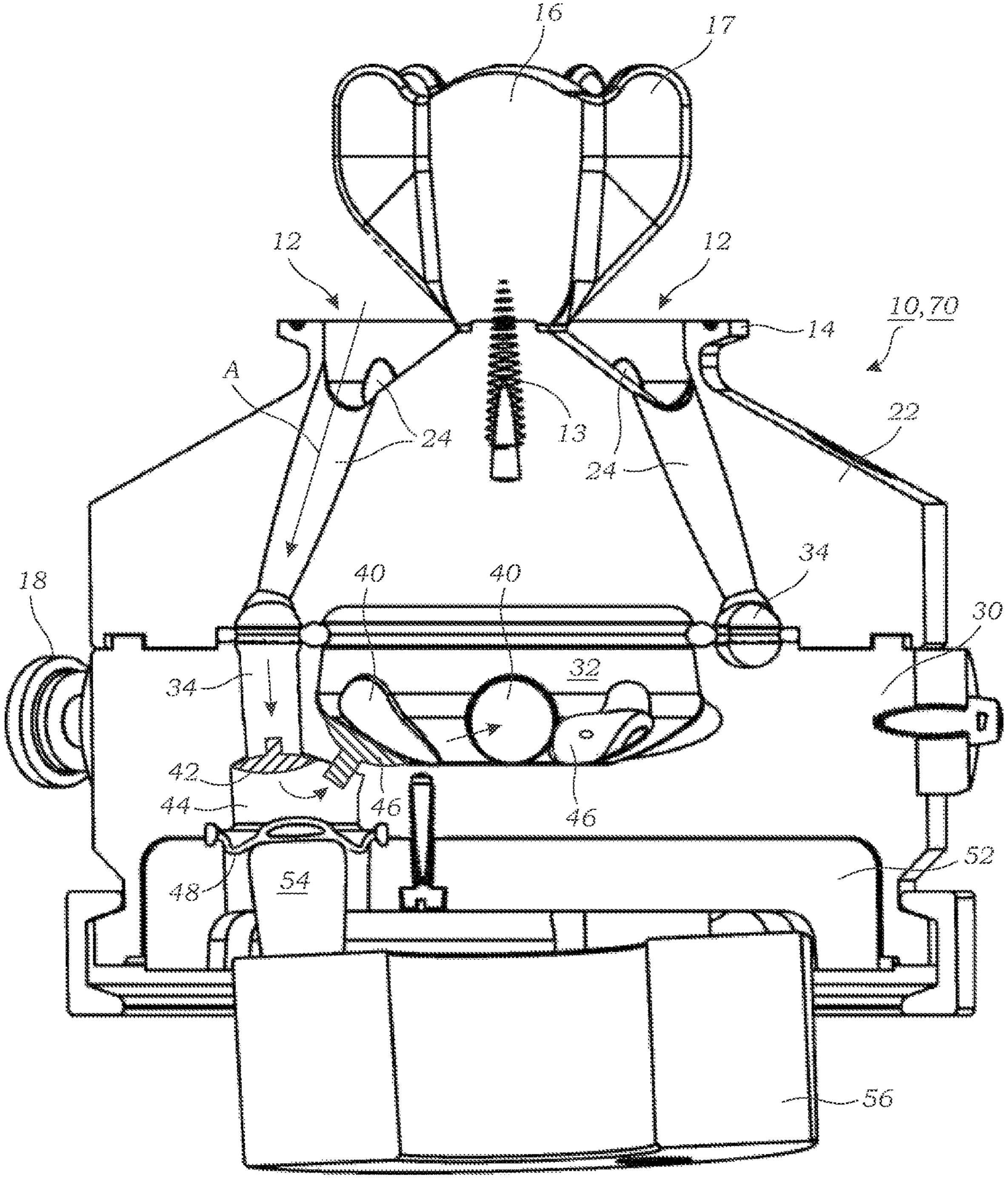
FIG. 3 illustrates a cross-sectional view of the pump embodiment of FIG. 1. The direction of fluid flow from the inlet to the outlet is illustrated by arrow A.
Figure 4:
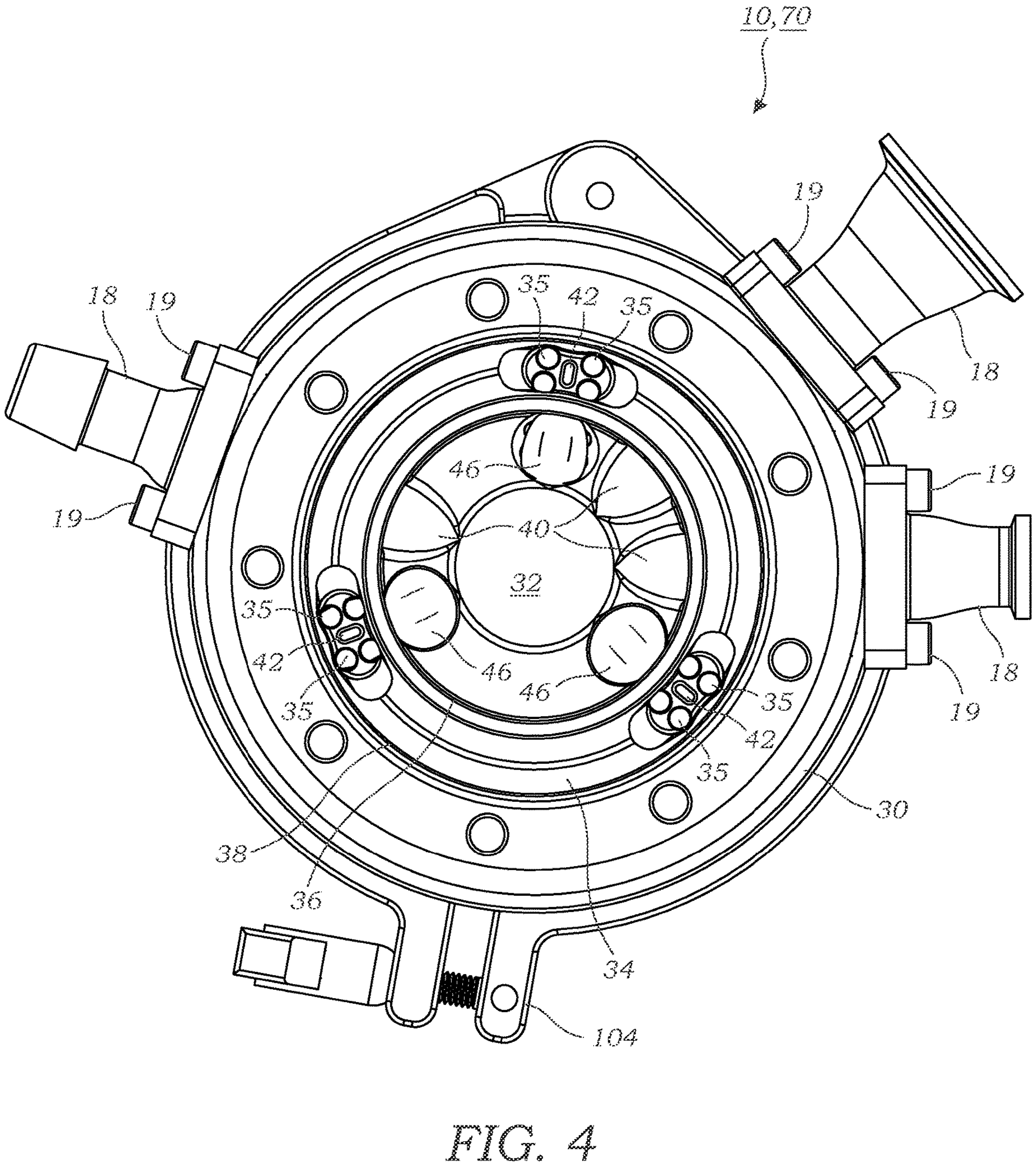
FIG. 4 is a cross-section illustrating the central housing of the pump of FIG. 1.
Figure 5:
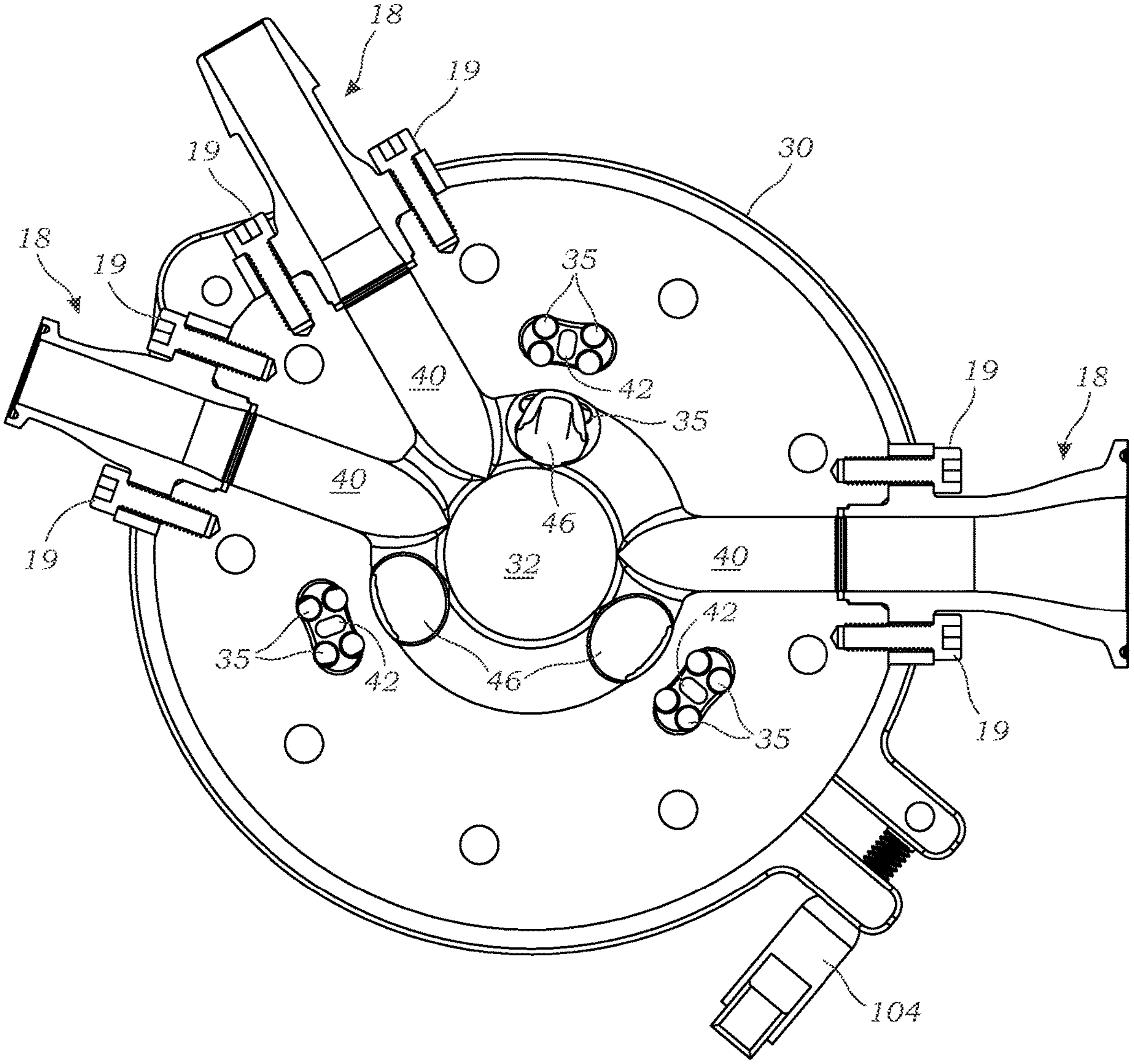
FIG. 5 is another cross-section taken along the central housing of the pump of FIG. 1.

The central chamber 32 includes outlet passageways 40 (FIGS. 2-5, 9, 10, 11) for each of the outlets 18. The outlet passageways 40 allow pressurized fluid from the central chamber 32 to exit the pump 10 (or pump/mixer 70) via the outlets 18. As best seen in FIG. 3, fluid enters the central chamber 32 in the following manner with reference to arrow A. Fluid first enters the pump 10 via the main inlet 12 where the fluid then flows into the plurality of passageways 24. The fluid then enters the outer chamber 34. During operation of the pump 10, in response to actuation of the diaphragms 48 as explained herein, the fluid within this outer chamber 34 then passes through a corresponding check valve 42 that permits the one-way flow of fluid into a corresponding lower chamber 44 located in the central housing 30. The lower chambers 44 are separate from one another and are associated with a particular check valve 42. The fluid passes through a second one-way check valve 46 that permits the one-way flow of fluid into the central chamber 32. The check valves 42, 46 are polymeric check valves that open in one direction in response to a fluid pressure differential in one direction but remain closed when the fluid pressure differential is not present or reverses. For example, there may be three sets of check valves 42, 46 (a total of six for the three flow passages) although more or less may be used. The check valves 42 located in the outer chamber 34 are positioned symmetrically about the outer chamber 34 (e.g., about 120° apart from one another). A series of holes or apertures 35 (FIG. 4) permit the passage of fluid from the outer chamber 34 to a lower chamber 44 associated with each of the check valve 42 (fluid flows down; in one direction). The check valve 42 allows fluid flow through the holes or apertures 35 in the flow direction but blocks flow in the reverse (up) direction by covering the holes or apertures 35. The check valves 46 located in the central chamber 32 are also positioned symmetrically about the central chamber 32 (e.g., about 120° apart from one another in this embodiment) (FIG. 4). A series of holes or apertures 35 also permits the passage of fluid from the lower chambers 44 to the central chamber 32 associated with each of the check valve pair 42, 46 (fluid flows inward to the central chamber 32 in one direction as seen by arrow A). The check valve 42 allows fluid flow through the holes or apertures 35 in the flow direction but blocks flow in the reverse direction by covering the holes or apertures 35. While three (3) pairs of check valves 42, 46 and three diaphragms 48 are illustrated, in other embodiments, there may be different numbers. For example, a single pair of check valves 42, 46 and a single diaphragm 48 could be used. Preferably, there are a plurality of pairs of check valves 42, 46 and a plurality of diaphragms 48. While both even and odd numbers of check valve pairs and diaphragms 48 are contemplated, an odd number may be preferred in some embodiments so as to reduce unwanted pulsatile flow effects. This includes 3, 5, 7, 9, etc. diaphragms 48 and check valve pairs 42, 46. In other embodiments, an even number of diaphragms may be used (e.g., 2, 4, 6, 8, 10).

Flexible diaphragm(s) 48 (FIGS. 2, 3, 6B, 9) is/are located at the bottom of each lower chamber 44 and is used to "pull" and "push" fluid through the pump 10 (or pump/mixer 70). The flexible diaphragms 48 are held about their periphery in a bottom housing or plate 52 that is secured to the central housing 30 via one or more fasteners 50 (e.g., bolts). Each flexible diaphragm 48 is also secured at its central region to an actuating element 54 (e.g., FIGS. 2, 3, 6B, 9). Movement of the actuating element 54 in the up or down direction causes the flexible diaphragm 48 to move similarly in the up or down direction (e.g., opposing directions). When the flexible diaphragm 48 moves in a first or down direction, this pulls fluid into the lower chamber 44. Conversely, when the flexible diaphragm 48 moves in the second or up direction (e.g., opposing direction), this pushes fluid into the central chamber 32. This is what causes the "pull" and "push" of fluid through the pump 10 or pump/mixer 70.

Figure 6A:
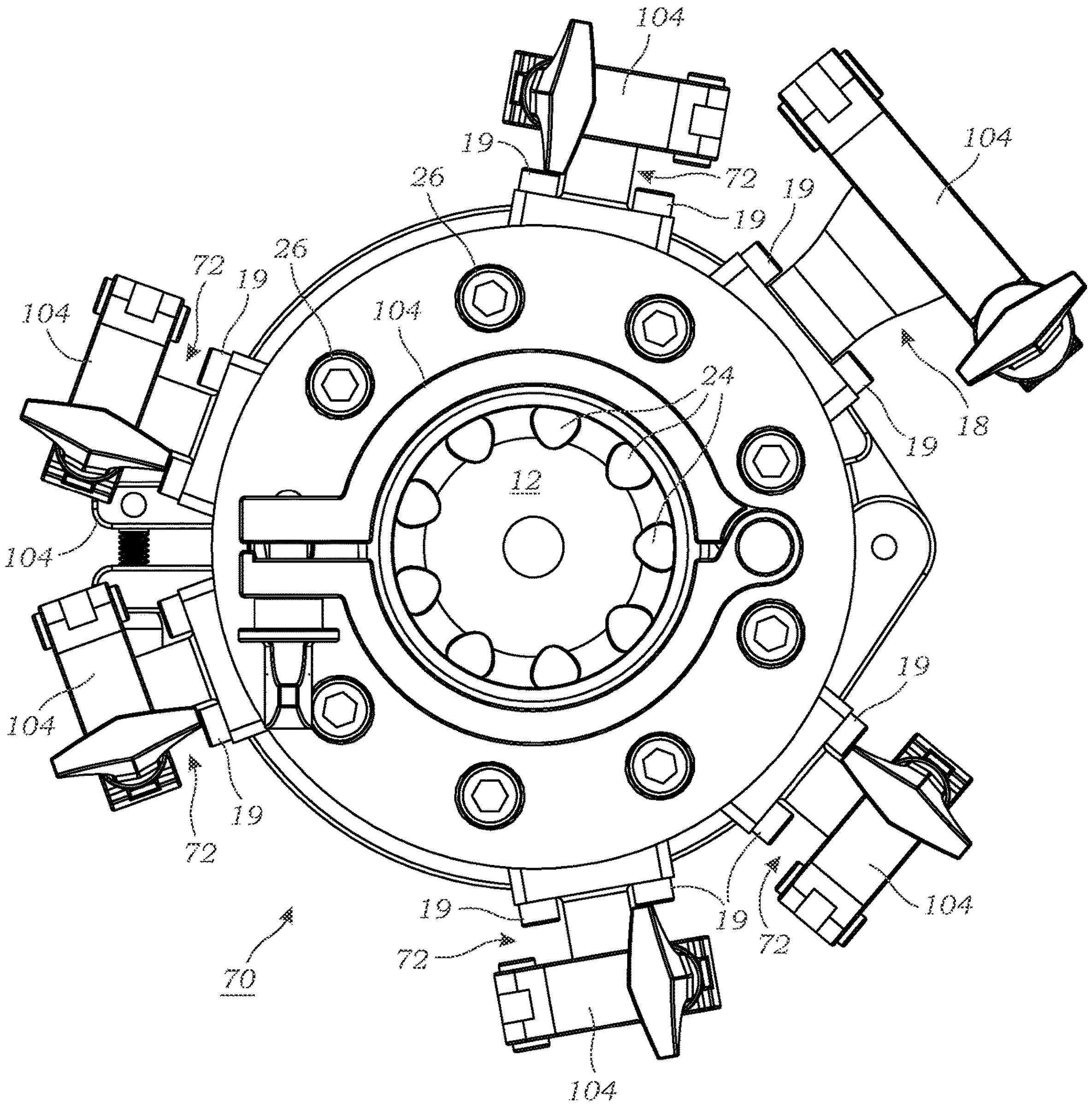
FIG. 6A illustrates a top-down view of a pump/mixer device according to one embodiment.
Figure 6B:
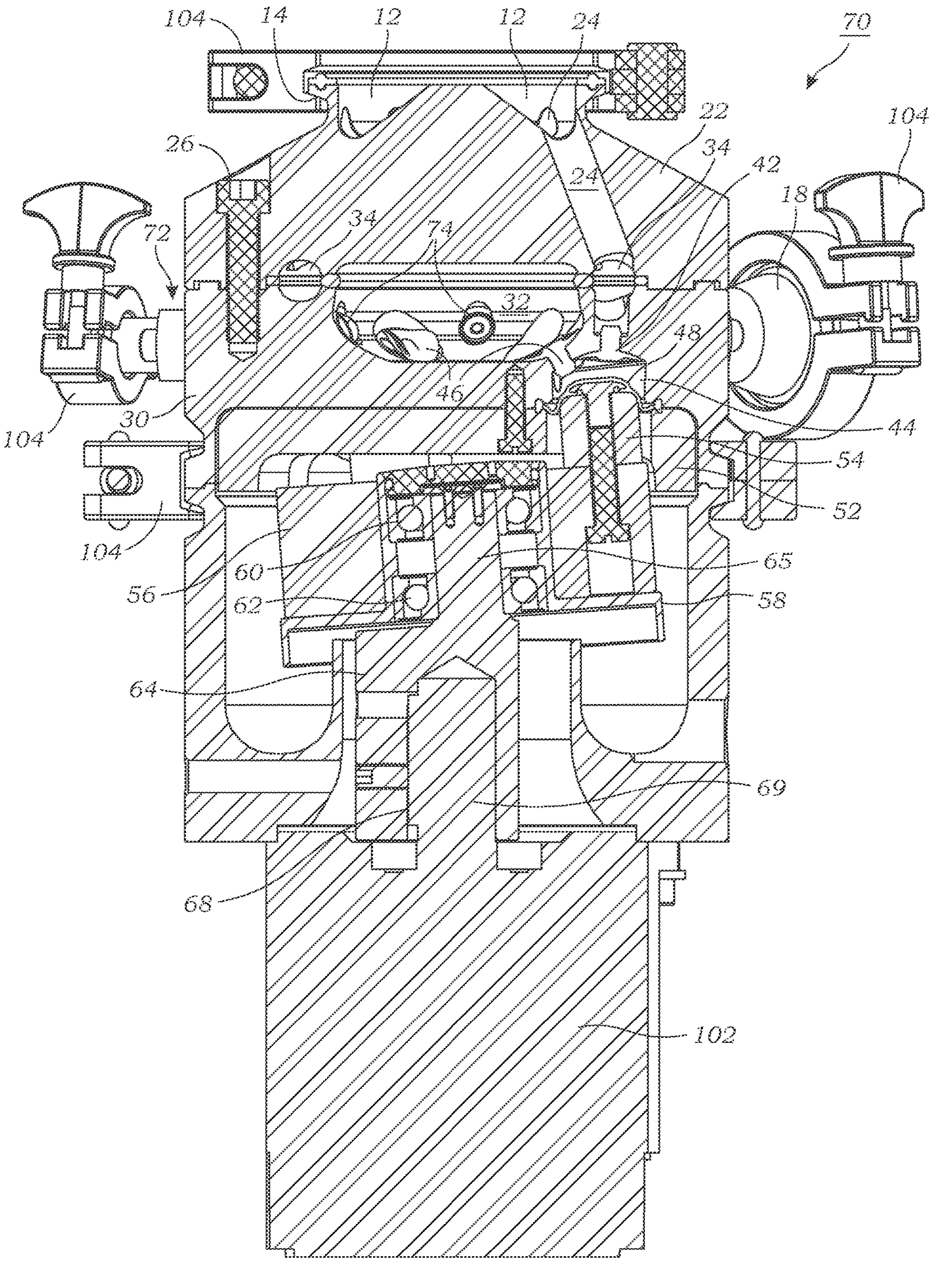
FIG. 6B illustrates a top-down cross-section of the pump/mixer device of FIG. 6A that shows the how the wobble or nutating plate interfaces with the actuating ring and actuating elements to drive the pump/mixer. While the pump/mixer is shown in FIGS. 6A and 6B, the pumping operation is the same with the pump of FIG. 1.
Figure 7:
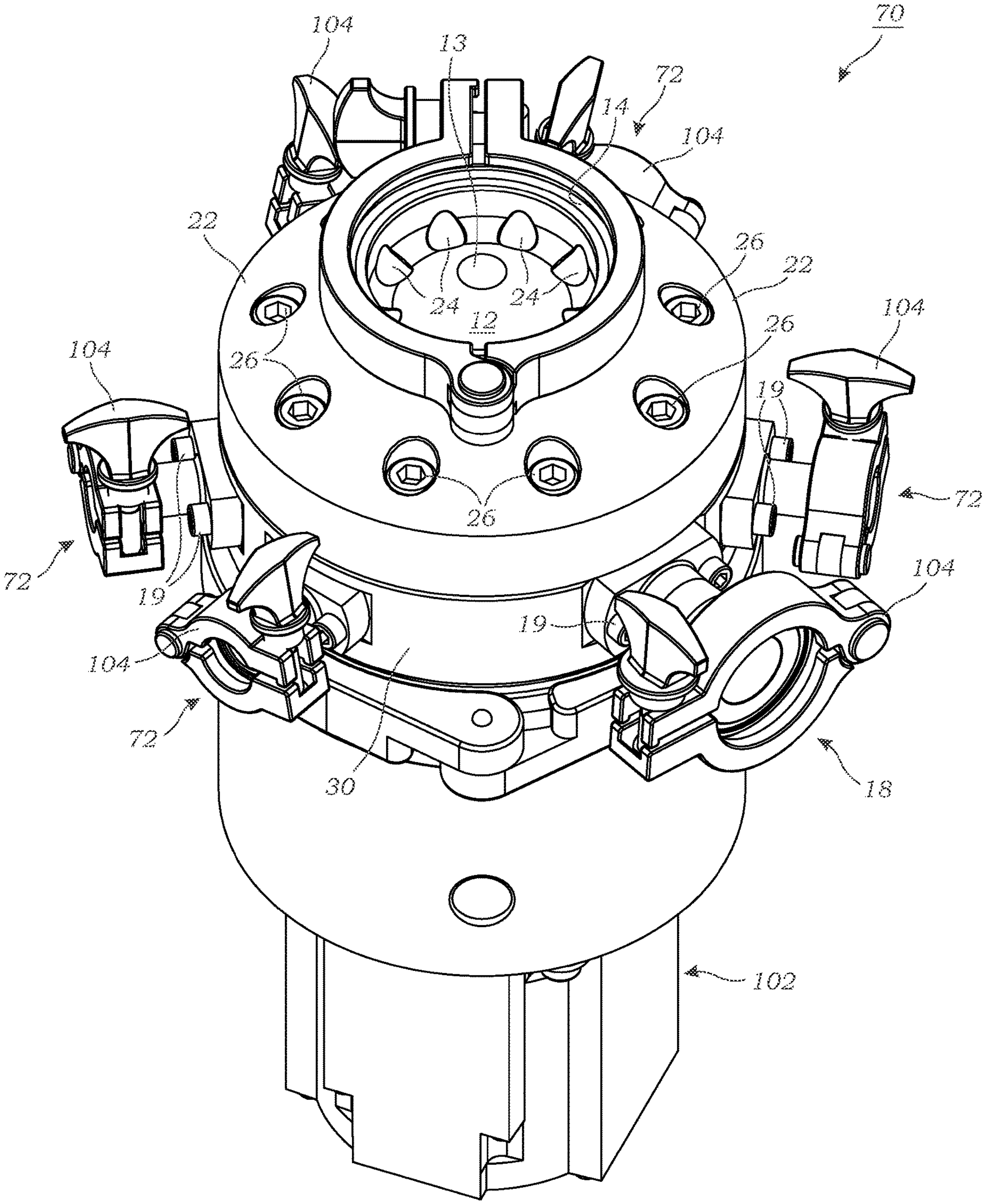
FIG. 7 illustrates a pump/mixer according to one embodiment. The pump/mixer includes a plurality of inlets (5) and a single outlet.
Figure 9:
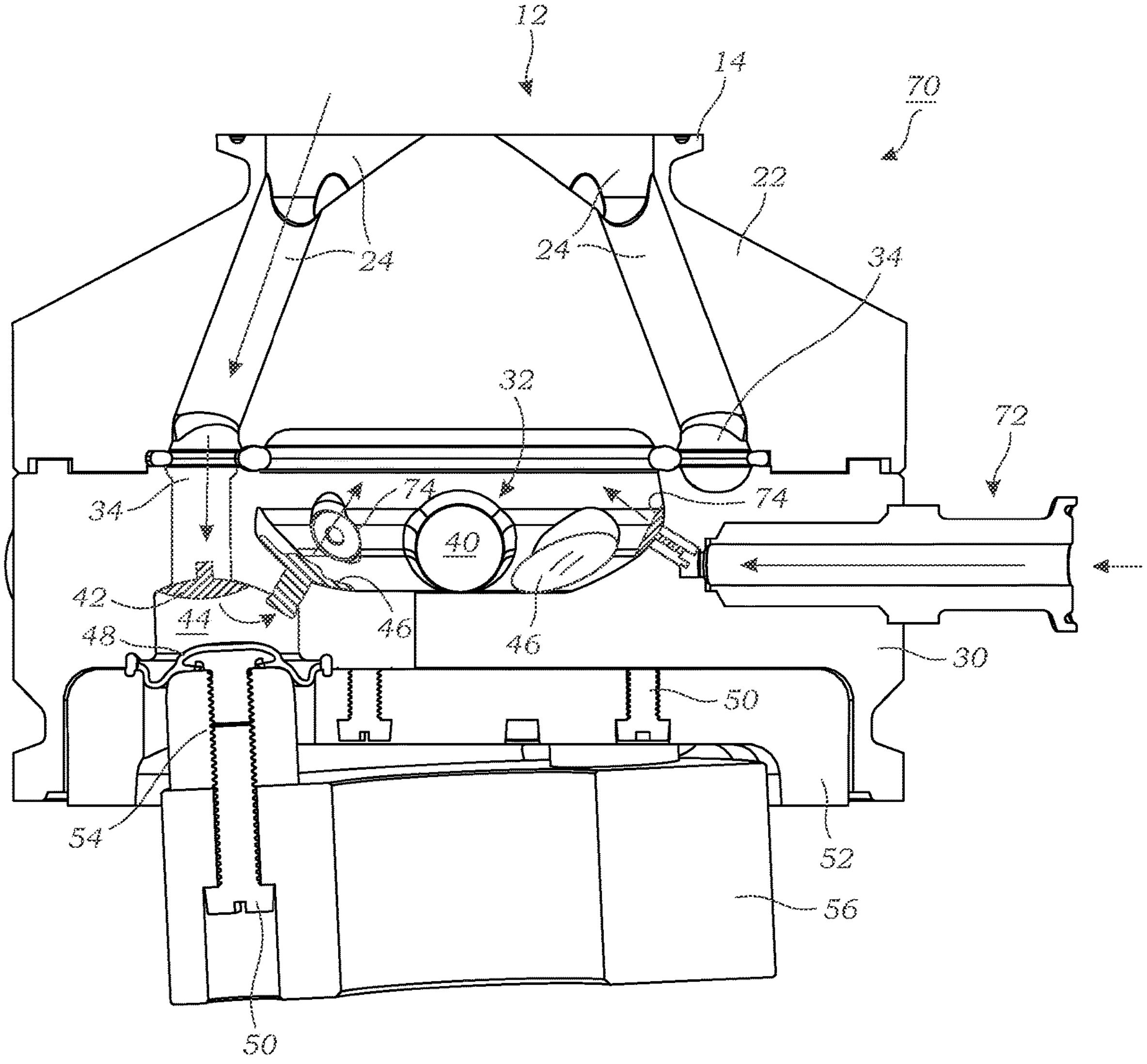
FIG. 9 illustrates a cross-sectional view of the pump/mixer of FIG. 7. The direction of fluid flow from the inlets (top and side) to the outlet is illustrated by arrows.
Figure 10:
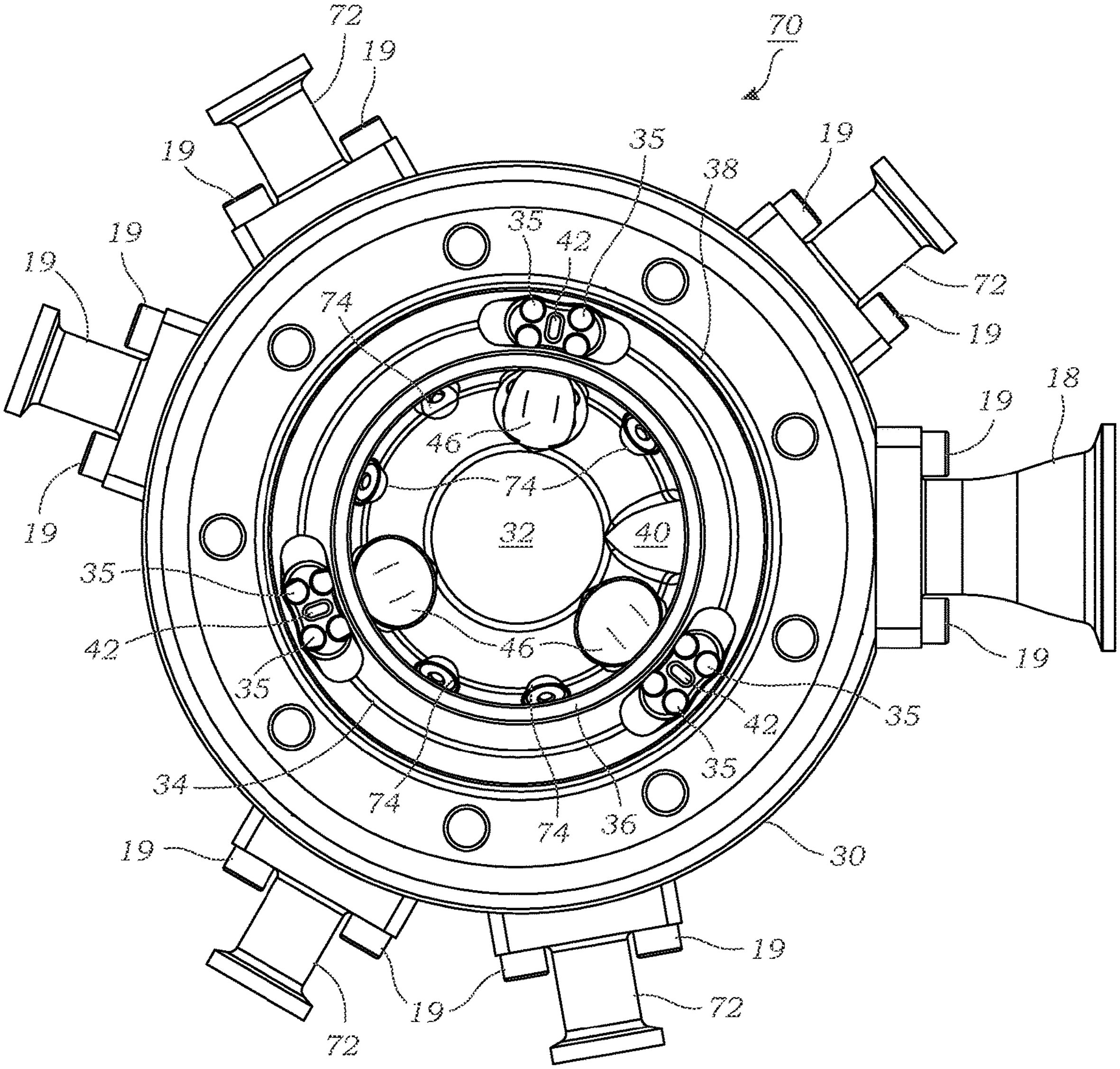
FIG. 10 is a cross-section showing the central housing of the pump/mixer of FIG. 7.
Figure 11:
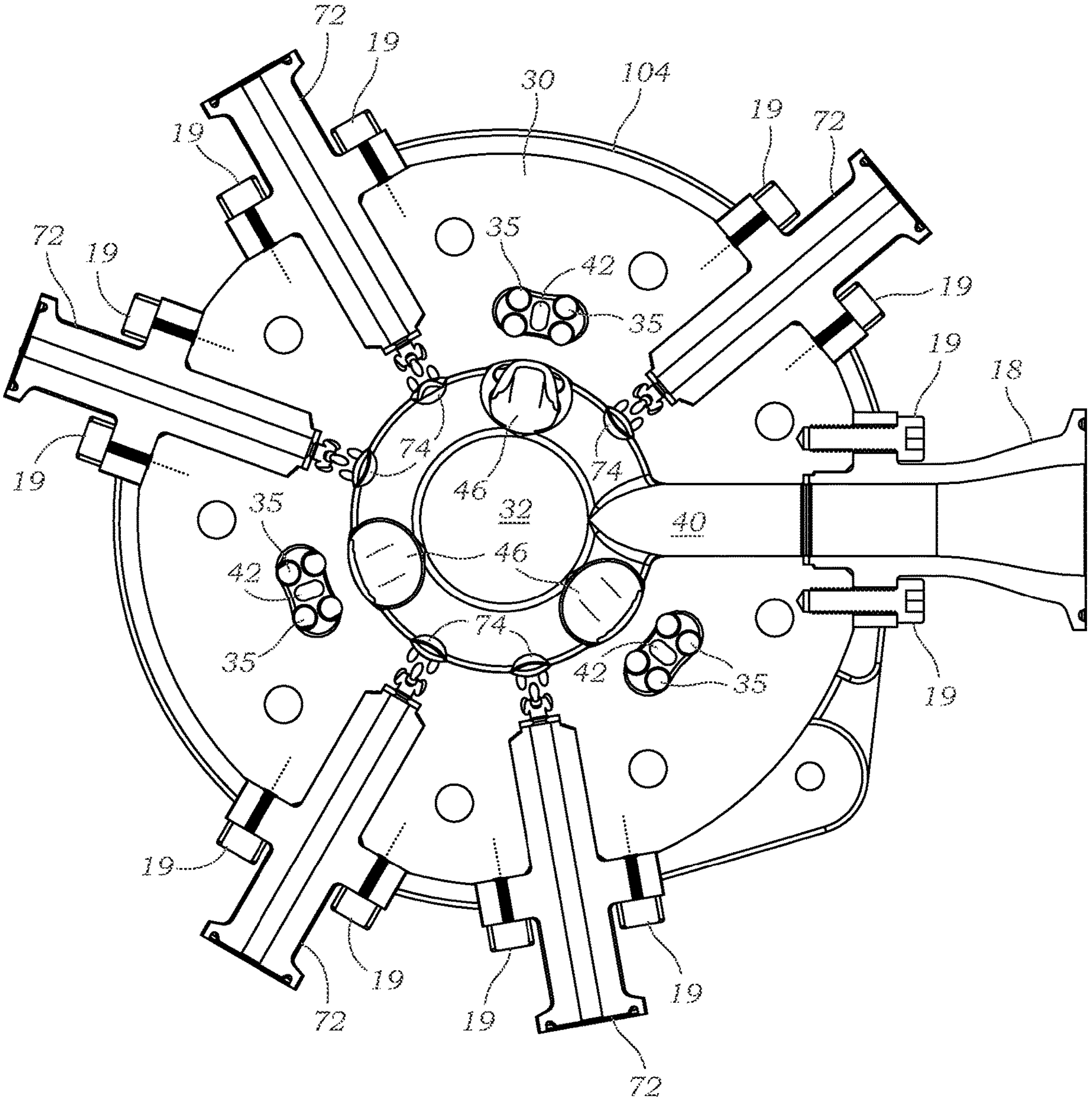
FIG. 11 is another cross-section taken of the central housing of the pump/mixer of FIG. 7.

In particular, sequential activation of diaphragms 48 is caused by actuating element(s) 54 secured to an actuating ring 56 (FIGS. 2, 3, 6B, 9) via fasteners 50 as seen in FIG. 9 (e.g., bolts) which are also attached to the actuating element(s) 54 or respective flexible diaphragm(s) 48 and move the diaphragm(s) 58 in the up/down direction. This causes the volume of each lower chamber 44 to either increase or decrease. Sequential activation of the diaphragms 48 is accomplished using a wobble plate or nutating disk 58 that is secured to the actuating ring 56 (FIGS. 2, 6B and 8). The wobble plate or nutating disk 58 includes first and second bearings 60, 62 mounted in the center thereof. The inner bearing surfaces of bearings 60, 62 are secured to the shaft 65 of an eccentric drive shaft 64. The eccentric drive shaft 64 includes a shaft 65 that is slightly angled (e.g., several degrees from vertical (~4°)) and the eccentric drive shaft 64, when rotated, causes the wobble plate or nutating disk 58 to wobble. The eccentric drive shaft 64 includes a shaft hole 68 that receives a motor shaft 69 of the motor or other drive unit 102. The motor shaft 69 is secured to the eccentric drive shaft 64 via a set screw 67 as illustrated in FIGS. 2 and 8. Rotation of the motor shaft 69 (which is secured to the eccentric drive shaft 64) causes the wobble plate or nutating disk 58 to sequentially actuate the actuating elements 54 with an up/down motion (via the wobble motion of the wobble plate or nutating disk 58). This up/down motion of the actuating elements 54 and secured diaphragms 48 creates the pumping action. For example, in a three diaphragm 48 configuration (first, second and third diaphragms 48), a first diaphragm 48 may move downward to pull fluid into the lower chamber 44 while the second and/or third diaphragms 48 may move upward to push fluid into the central chamber 32. The wobble plate or nutating disk 58 then "wobbles" to a next position/orientation to push the first diaphragm 48 upward while the second and/or third diaphragms 48 may move downward to pull fluid into the lower chamber 44 via the actuators/actuating element 54. This continues in sequential fashion to create the pumping action of the pump 10 (or pump/mixer 70).

FIG. 3 illustrates the direction of flow of fluid into the pump 10 or pump/mixer as shown by arrow A. Fluid flows downward from the main inlet 12 where the fluid then flows into the plurality of passageways 24. The fluid then enters the outer chamber 34. During operation of the pump 10, in response to actuation of the diaphragms 48 (in the down direction), the fluid within this outer chamber 34 then passes through a first check valve 42 that permits the one-way flow of fluid into a lower chamber 44 located in the central housing 30. Actuation of the diaphragm 48 in the opposite direction (in the up direction) in response to the actuating elements 54 pushes fluid into the central chamber 32. In particular, the fluid passes through a second check valve 46 into the central chamber 32. From the central chamber 32 the fluid which is under pressure can then leave the pump via the one or more outlets 18. Other pairs of first and second check valves 42, 46 operate in a similar manner.

Figure 12:
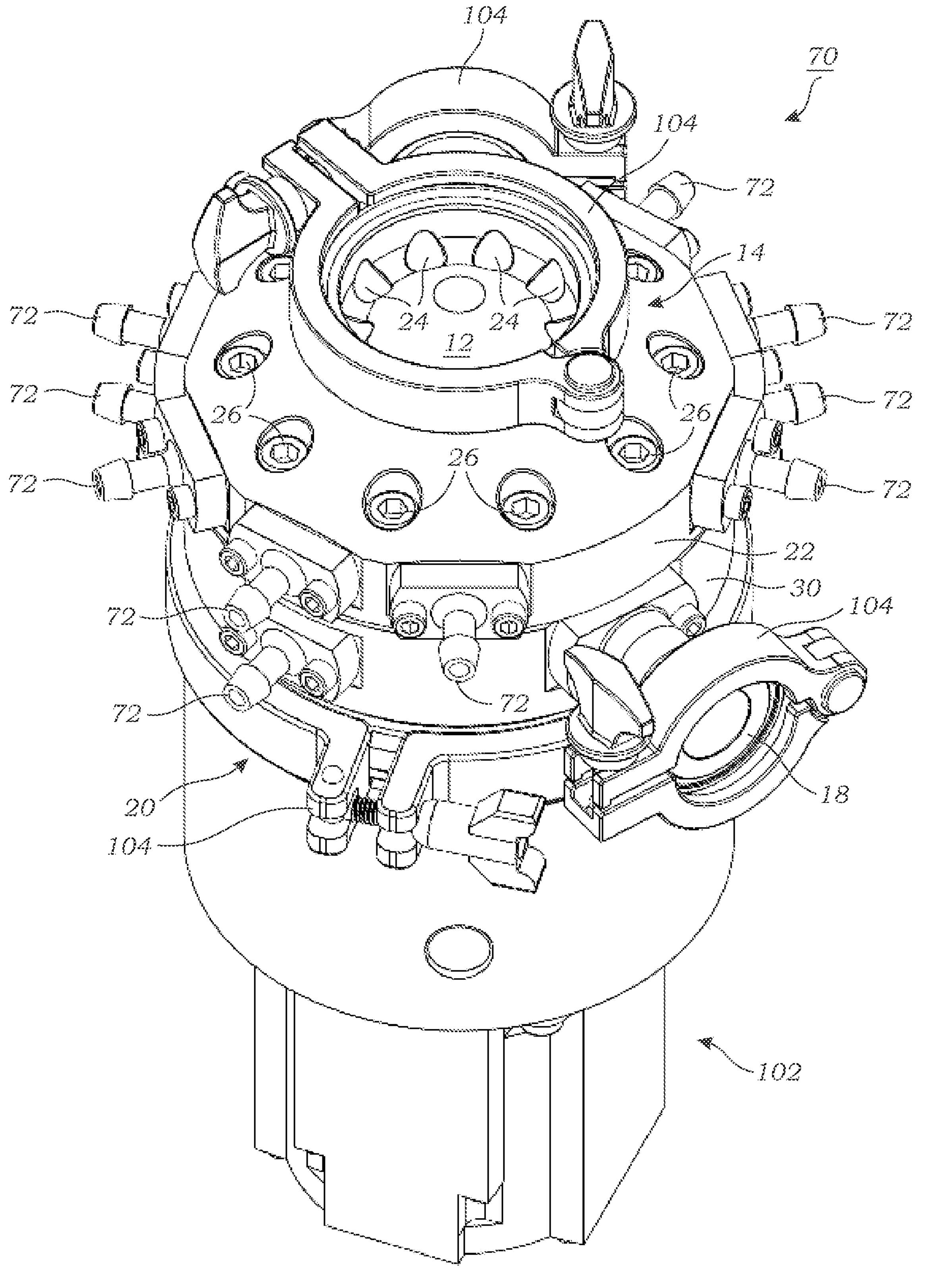
FIG. 12 illustrates an additional embodiment of a pump/mixer that includes a plurality of outlets and a plurality of inlets. In this embodiment, eleven (11) inlets are located on the upper housing and the central housing.

As explained herein, in other embodiments, a combination pump/mixer device 70 (providing both pumping and mixing functionality) is provided (described herein as pump/mixer 70). This is illustrated in FIGS. 6A, 6B and 7-12, 13B, 14, 16A, 16B, 17A-17C. The pump/mixer device 70 is similar to the pump 10 described herein with the exception of a few modifications to the design. The pump/mixer device 70 includes the same components of the pump 10 as described above but adds several additional elements. Those common elements use the same reference numbers as the pump 10 embodiment herein and will not be described again so as to avoid repetitive disclosure. The pump/mixer device 70 includes not only the top or upper "main" inlet 12 but also includes one or more additional inlets 72 that are located on the central housing 30 (or elsewhere on the pump/mixer device 70 such as upper housing 22 as seen in FIG. 12) and fluidically communicate with the central chamber 32 via inlet check valves 74 associated with each inlet 72 (best seen in FIGS. 6B, 8-11). The flow passage(s) that lead(s) from the inlet(s) 72 to the central chamber 32 may include jet structures (e.g., narrowed or tapered passageways as seen in FIG. 9) to further aid in mixing of the fluids in the central chamber 32. These jet structures may increase turbulent mixing that occurs within the central chamber 32. The central chamber 32 in the pump/mixer 70 embodiments effectively becomes a mixing chamber whereby the fluid from main inlet 12 and the additional inlet(s) 72 are able to mix with one another prior to being pumped out.

FIGS. 6A, 6B, 7, 8, 10, and 11 illustrate the central housing 30 showing five (5) additional inlets 72 and a single outlet 18 that communicate with the central chamber 32 and each additional inlet 72 has a corresponding check valve 74. The check valves 74 are one-way valves that let fluid enter the central chamber 32 from the inlets 72 but not in the opposite direction (i.e., fluid cannot flow out of the inlets 72 from the central chamber 32). The additional inlet(s) 72 may also be located on the upper housing 22 as illustrated in FIG. 12. For example, the additional inlets 72 may be located in both the upper housing 22 and the central housing 30. This provides the ability to locate a large number of inlets 72 about the periphery of the pump/mixer 70. This may also require increasing the size of the central chamber 32 to accommodate the check valves 74 in the wall of the central chamber 32.

The inlets 72 may be the same size and type. Of course, it should be appreciated that different sizes and types of inlets 72 (e.g., inlet connector types) may be used with the pump/mixer 70. These may be barbed inlets 72, inlets 72 with sanitary connections, and the like. The inlets 72 may optionally be removably secured to the body of the pump/mixer 70 via fasteners 19 (e.g., bolts) as illustrated. The inlets 72 may also be integrated into the body of the pump/mixer 70. In addition, in this embodiment, a single outlet 18 is illustrated. Other embodiments may include a plurality of outlets 18. For example, the pump/mixer 70 may include a plurality of inlets 72 and a plurality of outlets 18. The inlets 72 and outlet(s) 18 include O-rings 75 (FIG. 8) for a fluid-tight connection to the pump/mixer 70.

The outlet(s) 18 and inlet(s) 72 of the pump 10 or pump/mixer 70 may terminate in a variety of ends or connectors used in biopharmaceutical processes. These include hygienic connectors, barb locks, hose barbs, flanges, TC connectors, disposable aseptic connectors (DAC), and the like. The outlet(s) 18 and inlet(s) 72 may optionally include or incorporate a valve directly or indirectly therein. Tubing or other conduit 112 (FIG. 14) may also interface with the outlet(s) 18 and inlet(s) 72 of the pump 10 or pump/mixer 70. The conduit 112 may be removably attached to the outlet(s) 18 and inlet(s) 72 of the pump 10 or pump/mixer 70. In still another embodiment, the outlet(s) 18 and inlet(s) 72 of the pump 10 or pump/mixer 70 may simply be an aperture or opening through which fluid passes. This aperture or opening may be threaded internally so that the outlet(s) 18 and/or inlet(s) 72 can accommodate a threaded connecting component or insert that interfaces with the threaded outlet(s) 18 and inlet(s) 72 of the pump 10 or pump/mixer 70.

Figure 13A:
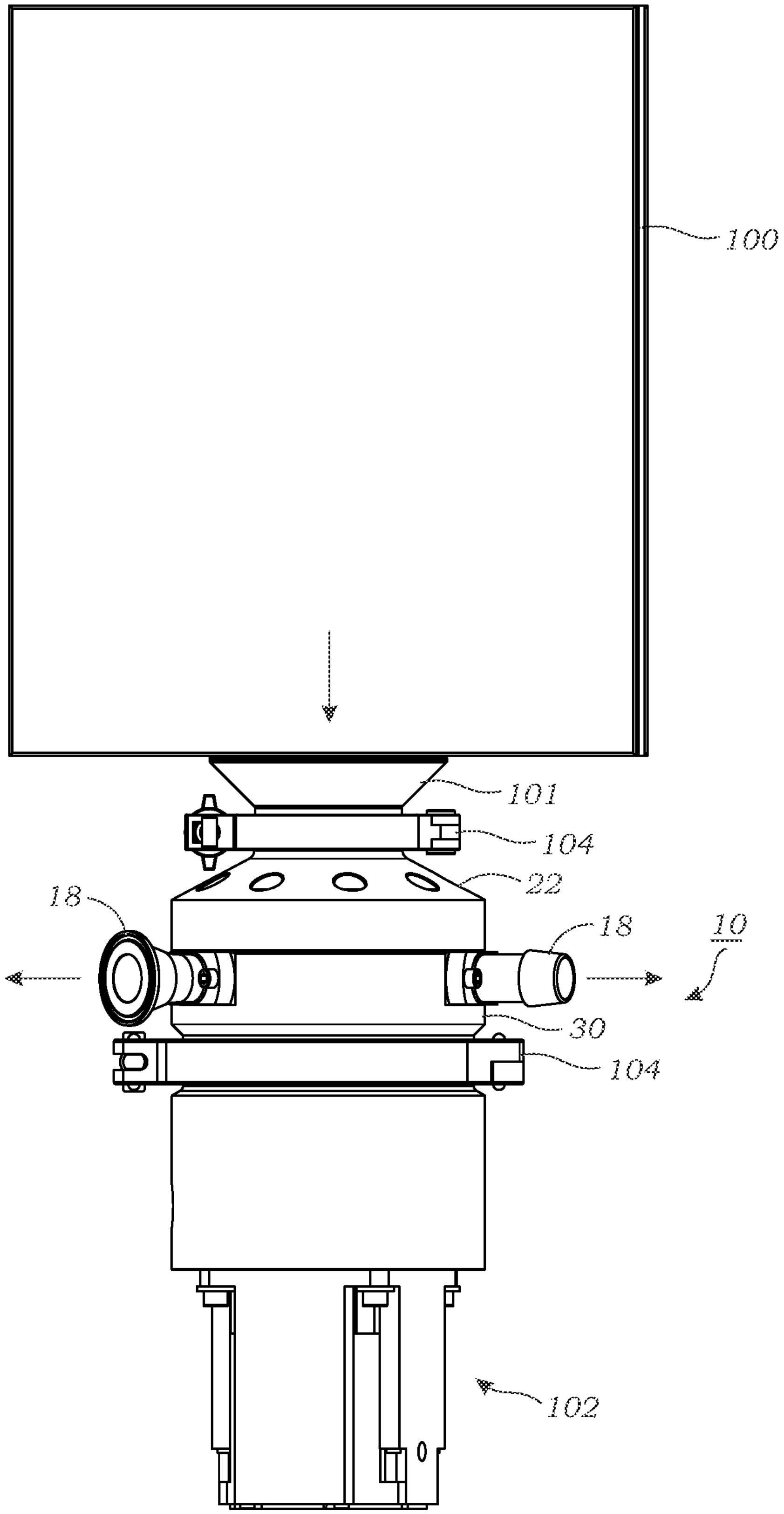
FIG. 13A illustrates an embodiment of a pump (e.g., a pump of the embodiment of FIG. 1) being secured to a container or vessel.
Figure 13B:
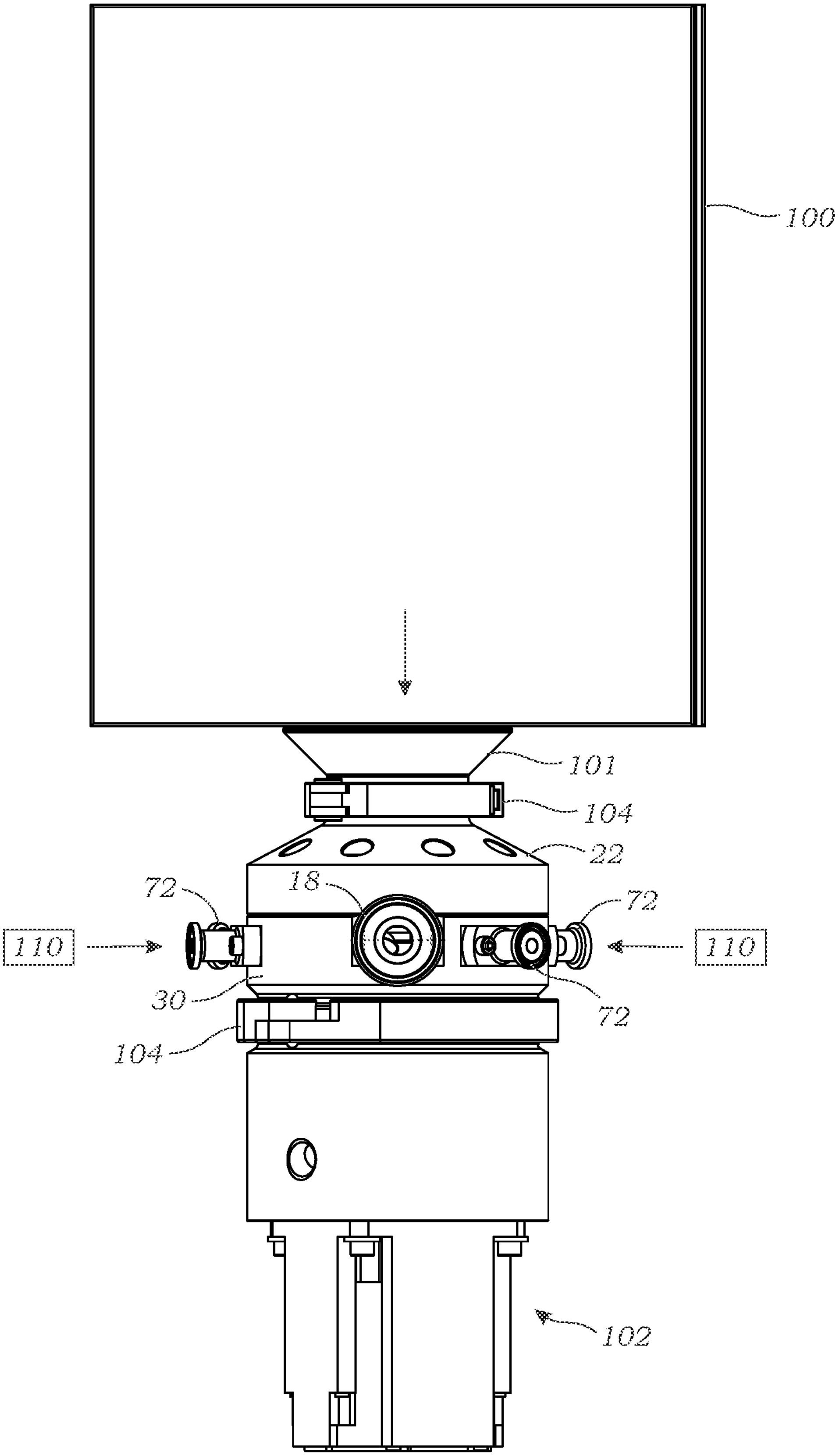
FIG. 13B illustrates an embodiment of a pump/mixer (e.g., a pump/mixer of the embodiment of FIG. 7) being secured to a container or vessel.
Figure 14:
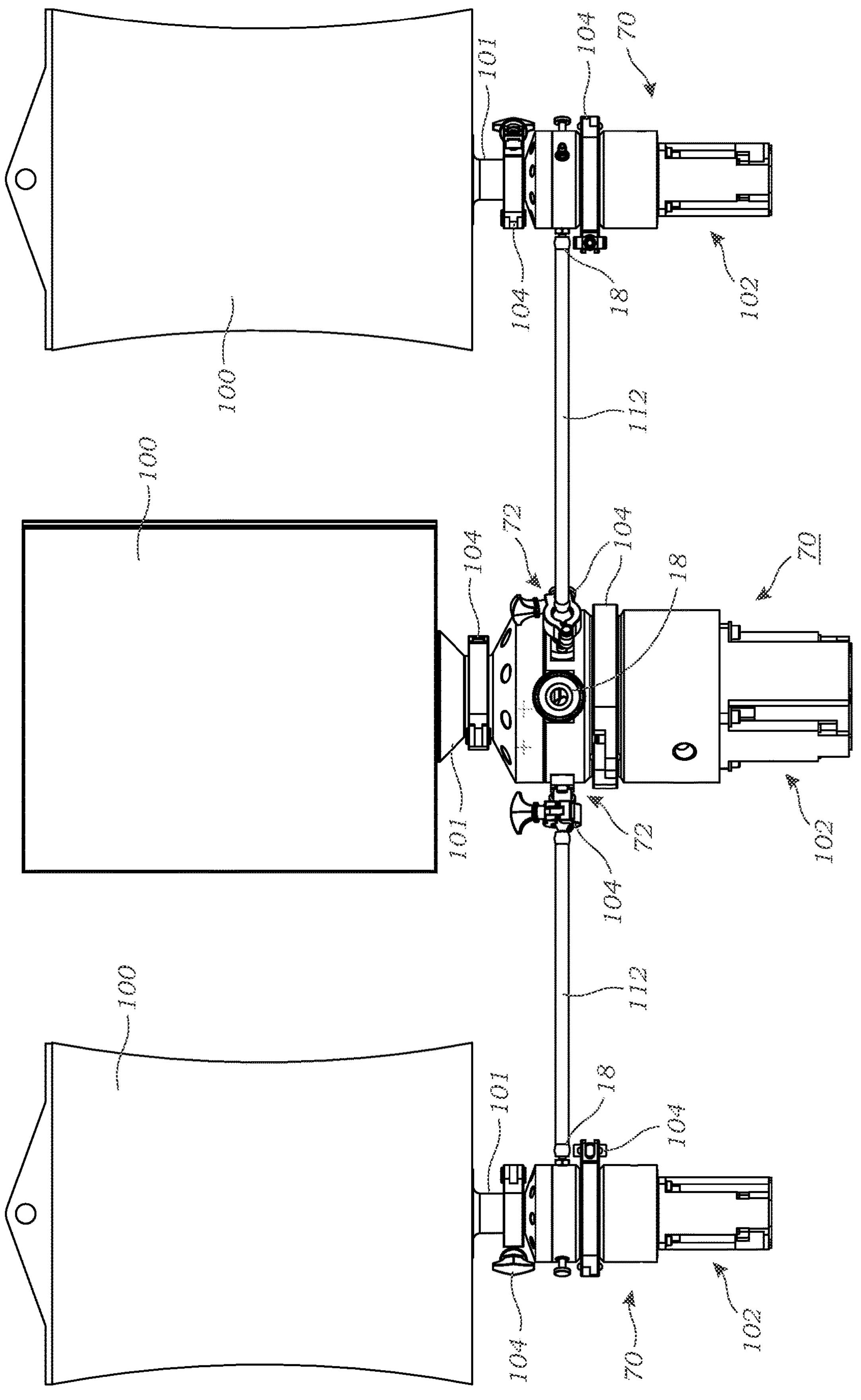
FIG. 14 illustrates a central pump/mixer secured to a vessel or container along with conduits or tubing that connect inlets on the centrally located pump/mixer to two different pump(s) and/or pump/mixer(s) coupled to respective vessels or containers.

FIG. 12 illustrates an embodiment of a pump/mixer 70 with a large number of additional inlets 72 (eleven (11) are illustrated in this embodiment). The number of outlets 18 and number of additional inlets 72 varies and is application specific. For some applications the pump/mixer 70 may only have a single outlet 18, however, other applications may include two (2), three (3), four (4), or five (5) outlets 18. Likewise, the number of inlets 72 is application dependent. This may include between one (1) and twenty (20) additional inlets 72. Larger sized pump/mixers 70 may include, for example, fifteen (15) to twenty (20) additional inlets 72. More typically, in smaller sized pump/mixers 70 there are typically less than ten (10) additional inlets. Each inlet 72 in this particular embodiment includes barbed ends that interface with conduits or tubing 112 (see e.g., FIG. 14). FIG. 12 further illustrate a sanitary clamp 104 that can be used to secure the pump-mixer 70 to the bottom of the container or vessel 100 such as illustrated in FIGS. 13A, 13B, and 14. Additional sanitary clamps 104 may be used to secure devices, devices, tubing (e.g., tubing 112) to the outlets 18.

FIG. 13A illustrates the operation of the pump 10 according to one embodiment. In this embodiment, a container or vessel 100 is provided with the pump 10 secured to the bottom or lower side via a port or coupler 101 (or other attachment scheme). A plurality of outlets 18 are located on the pump 10. The container or vessel 100 is filled with a fluid. The pump 10 is turned on by providing power the motor or other drive unit 102 secured to the pump 10. Fluid contained in the container or vessel 100 then enters the main inlet 12 as described herein and is pumped out the plurality of outlets 18. Arrows indicate the direction of flow. The speed of the motor or other drive unit 102 may be controlled to adjust the flow rate through the pump 10. This may occur through an automated controller or other control circuitry that is operably connected to the motor or drive unit 102.

FIG. 13B illustrates the operation of the pump/mixer 70 according to one embodiment. In this embodiment, a container or vessel 100 is provided with the pump/mixer 70 secured to the bottom or lower side via a port or coupler 101. In this embodiment, there is a single outlet 18 and a plurality of inlets 72 located on the pump/mixer 70. The container or vessel 100 is filled with a fluid. The plurality of inlets 72 are fluidically connected via conduits, tubing, or the like (e.g., tubing 112 of FIG. 14) to one or more sources of fluid that have their own separate pumps 110 that pump fluid into the central chamber 32 such as that illustrated in FIG. 14. Note that the separate pumps 110 may in some embodiments include conventional pumps. In other embodiments, the separate pump(s) 110 may include the pumps 10 or pump/mixers 70 described herein (FIG. 14). The flow rate of the fluids through the plurality of inlets 72 may be individually controlled to adjust the mixing of fluids in the pump/mixer 70. For example, the flow rate of the fluids into the different additional inlets 72 may be controlled through the operation of the respective pump(s) 110 that is used to pump the applicable fluid into the pump/mixer 70. In addition, in some embodiments, valves may be incorporated into the plurality of inlets 72 (or fluidically coupled thereto) to selectively turn on/off various inlets 72 (or adjust flow into the inlets 72 or out of outlet 18). The pump/mixer 70 is turned on by providing power the motor or other drive unit 102 secured to the pump/mixer 70. Fluid contained in the container or vessel 100 then enters the main inlet 12 as described herein (illustrated by down arrow) and is mixed with the fluid(s) from the one or more inlets 72 inside the central chamber 32 and is pumped out the one or more outlets 18.

It should be appreciated that for an embodiment of a pump/mixer 70 that includes a plurality of additional inlets 72, respective fluids that are pumped into the additional inlets 72 into the pump/mixer 70 may be done simultaneously or sequentially. For example, consider a pump/mixer 70 that includes a main inlet 12 that receives fluid A, a single outlet 18, and three (3) additional inlets 72 each coupled to respective fluids B, C, and D. In one embodiment, the pump/mixer 70 operates to sequentially mix fluid A with fluid B, then mix fluid A with fluid C, then mix fluid A with fluid D. This may be done by sequentially pumping fluids B, C, and D into the pump/mixer 70 while it draws fluid A from the main inlet 12. Alternatively, fluids B, C, and D may be simultaneously mixed with fluid A by pumping the respective fluids into the three different additional inlets 72. Of course, different combinations thereof may also be used.

Figure 15:
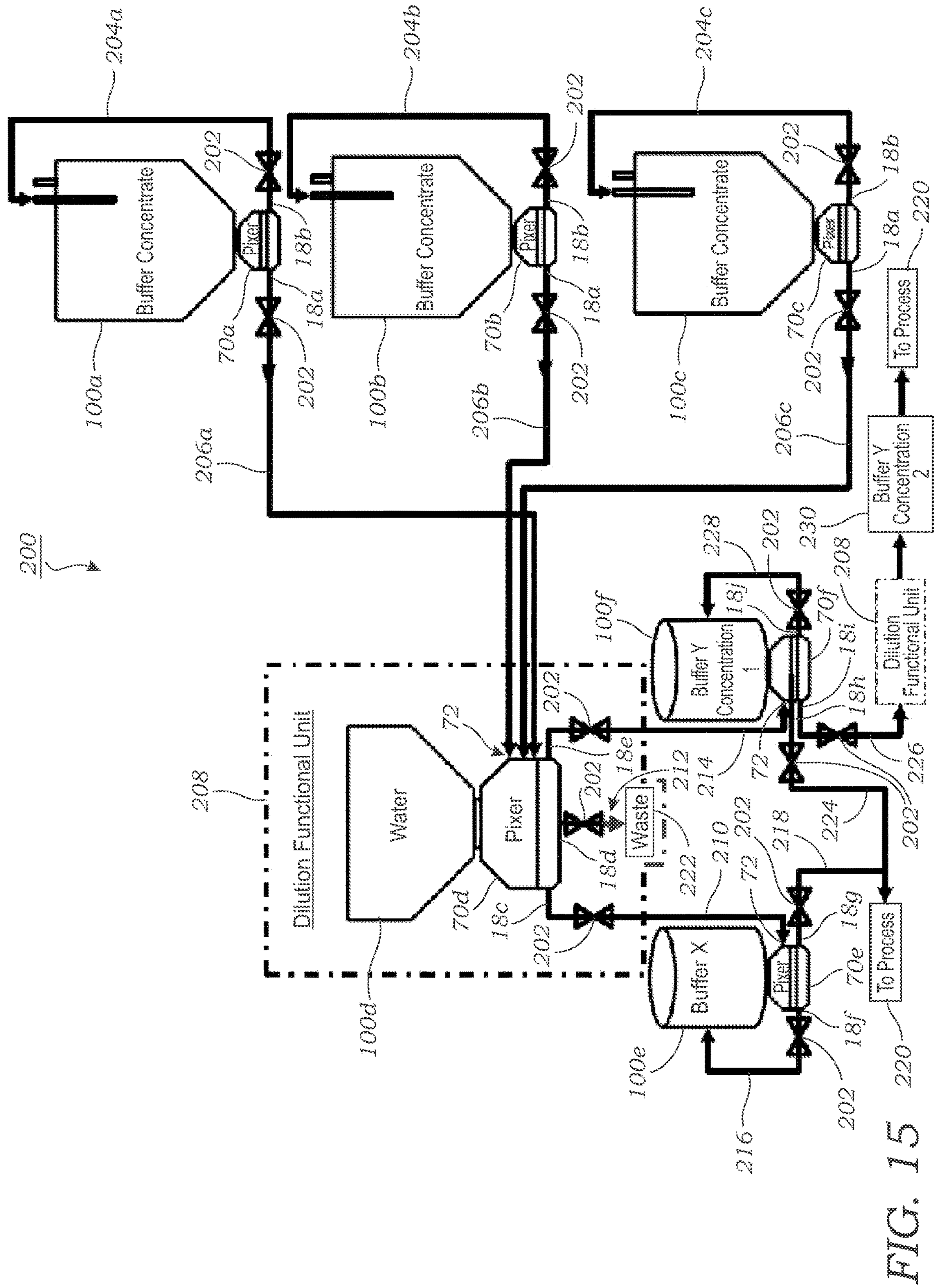
FIG. 15 illustrates an exemplary dilution operation that uses a plurality of pump/mixers.

It should be appreciated that a plurality of pump 10 and/or pump/mixer 70 may be combined together in various systems depending on the application. For example, multiple pumps 10 and/or pump/mixers 70 may be combined to operate a dilution system whereby concentrated feedstock fluid media is subject to a dilution with a diluent such as water. Concentrated media may be pumped out of the container or vessel 100 using a pump 10 and/or pump/mixer 70. This output may then serve as the input to one or more additional downstream such as illustrated in FIG. 15. Likewise, the pump 10 and/or pump/mixer 70 may be used in connection with a container or vessel 100 (or multiple such containers or vessels 100) that is/are used as a bioreactor container or vessel 100 as illustrated in FIGS. 16A, 16B, 17A-17C. Fluid contained in the bioreactor may be, for example, pumped using a pump and/or pump mixer 70 and subject to processing (e.g., filtration, aeration, gas exchange, and the like) and returned to the container or vessel 100. The additional inlets 72 may be used to mix the bioreactor contents with reagents, buffers, chemicals, and the like.

FIG. 15 illustrates one exemplary system 200 that is used to generate different buffer solutions as needed. The system 200 enables the generation of buffer solutions of different compositions and/or concentrations. The system 200 includes multiple pump/mixers 70*a*, 70*b*, 70*c* that are fluidically connected to respective containers or vessels 100*a*, 100*b*, 100*c*. Each container or vessel 100*a*, 100*b*, 100*c* contains a different buffer concentrate. While three (3) such different buffer concentrates are illustrated more or less may be used. Each pump/mixer 70*a*, 70*b*, 70*c* has two outlets 18*a*, 18*b* that lead to respective fluid paths (e.g., using conduits or tubing coupled to the outlets 18*a*, 18*b*). Valves 202 are located in the fluid paths that can be used to open/close the respective fluid flows from outlets 18*a*, 18*b*. Fluid paths 204*a*, 204*b*, 204*c* recirculate fluid back into the respective container or vessel 100*a*, 100*b*, 100*c*. Fluid paths 206*a*, 206*b*, 206*c* leads to additional inlets 72 of another pump/mixer 70*d* (e.g., in this example there are three (3) such inlets 72). This pump/mixer 70*d* is fluidically coupled to a container or vessel 100*d* that contains a diluent such as water. The water is used to dilute the concentrated buffer that arrives from fluid paths 206*a*, 206*b*, 206*c*. The pump/mixer 70*d* in combination with the container or vessel 100*d* operates as a dilution functional unit 208 as is illustrated.

The pump/mixer 70*d* includes three outlets 18*c*, 18*d*, 18*e* that lead to respective fluid paths 210, 212, 214. Valves 202 are located in the fluid paths 210, 212, 214 can be used to open/close the respective fluid flows from outlets 18*c*, 18*d*, 18*e*. A first outlet 18*c* leads to fluid path 210 enters another pump mixer 70*e* via an inlet 72. This pump/mixer 70*e* is fluidically coupled to a container or vessel 100*e*. The pump/mixer 70*e* includes two outlets 18*f*, 18*g* that lead to respective fluid paths 216, 218. Fluid path 216 recirculates fluid back into the container or vessel 100*e*. Fluid path 218 leads to the process 220 as illustrated in FIG. 15. The process 220 generically refers to any downstream process that requires the appropriate buffer. The second outlet 18*d* is located in fluid path 212 which leads to waste 222. The third outlet 18*e* is located in fluid path 214 and leads to another pump/mixer 70*f* via an inlet 72. This pump/mixer 70*f* is fluidically coupled to a container or vessel 100*f*. The pump/mixer 70*f* includes three outlets 18*h*, 18*i*, 18*j* that lead to respective fluid paths 224, 226, 228. Fluid path 224 leads to the process 220 as illustrated in FIG. 15. Fluid path 228 recirculates fluid back into the container or vessel 100*f* Fluid path 226 is directed to another dilution functional unit 208. This additional dilution functional unit 208 operates similar to the pump/mixer 70*d* and associated container or vessel 100*d* which is used to dilute the concentration of the buffer from container or vessel 100*f*. This is illustrated in FIG. 15, whereby a diluted buffer 230 (e.g., Buffer Y, concentration 2) is generated. This diluted buffer is then directed to process 220.

The system 200 of FIG. 15 is used to generate buffer fluids of different compositions and/or concentrations. In this example, buffer X is generated using the first dilution functional unit 208 that includes pump/mixer 70*d* and associated container or vessel 100*d*. The generated buffer X may be stored temporarily in container or vessel 100*e* until needed. The pump/mixer 70*e* can be used to recirculate buffer X to maintain the buffer and prevent, for example, precipitation of buffer species or constituents. Buffer Y is also generated using the first dilution functional unit 208 which is stored in container or vessel 100*f*. Note that water may be used to flush the pump/mixer 70*d* between creation of buffer X and buffer Y. This wash may be sent to waste 222. Buffer Y may be stored temporarily in container or vessel 100*f* until needed. The pump/mixer 70*f* can be used to recirculate buffer Y to maintain the buffer as explained herein. Buffer Y may be used in the process 220 using fluid path 224. Alternatively, buffer Y may need further dilution in which case fluid path 226 is used to direct buffer Y to another dilution functional unit 208 to create diluted buffer Y (e.g., buffer Y at concentration 2). This diluted buffer can then be sent to the process 200.

It should be appreciated that FIG. 15 illustrates one illustrative embodiment of a system 200 that uses a constellation of pump/mixers 70. Different configurations and modifications may be made depending on the need. Different numbers of pump/mixers 70 (or pumps 10) may be used. The pump/mixers 70 that are used may include different numbers of additional inlets 72 and outlets 18 may be used. Additional levels or cascades of pumps/mixers 70 may be used as well.

Figure 16A:
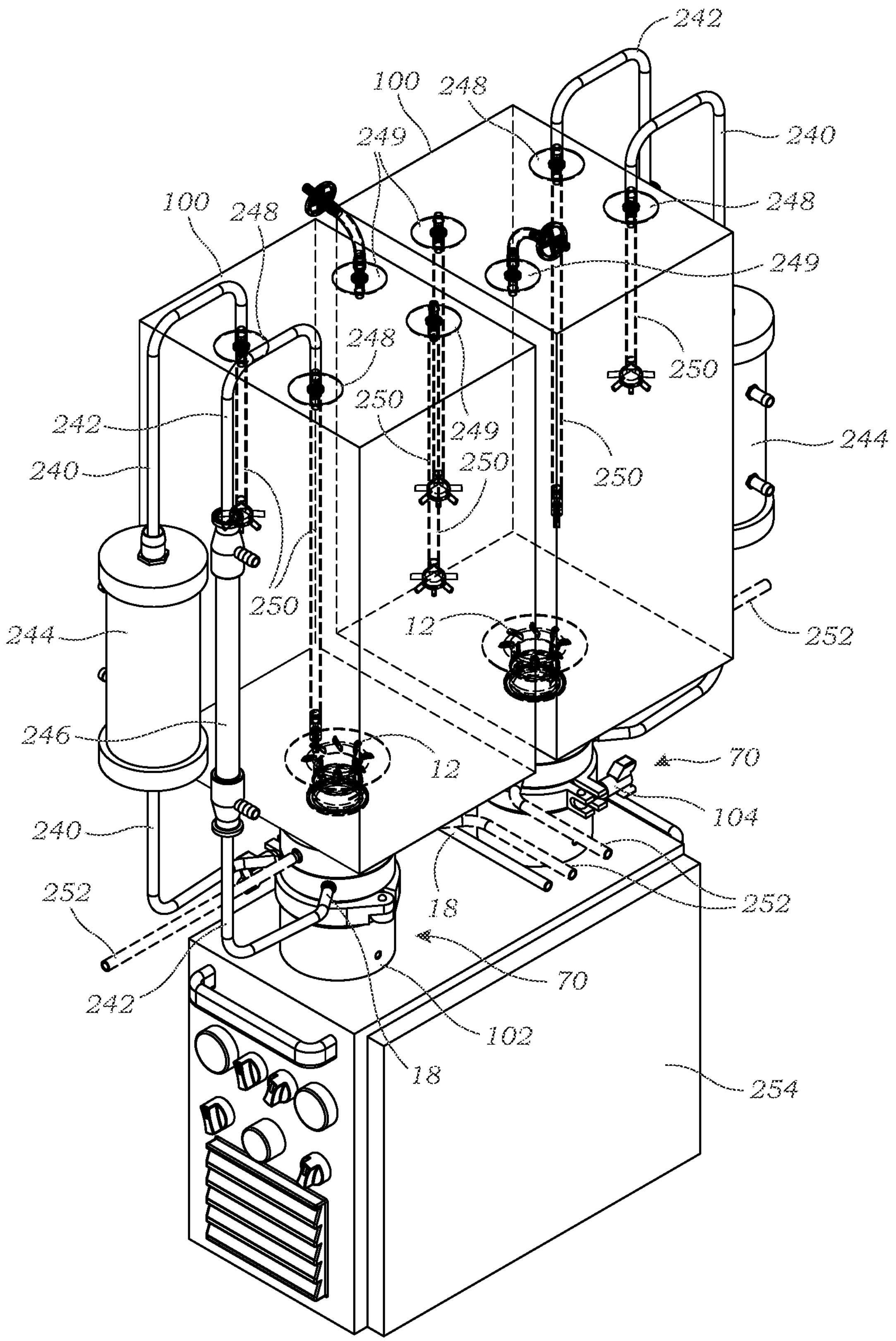
FIG. 16A illustrates a perspective view of an embodiment of pump/mixers used in a bioreactor application. Two bioreactor vessels or containers are illustrated, each with their own dedicated pump/mixer device.
Figure 16B:
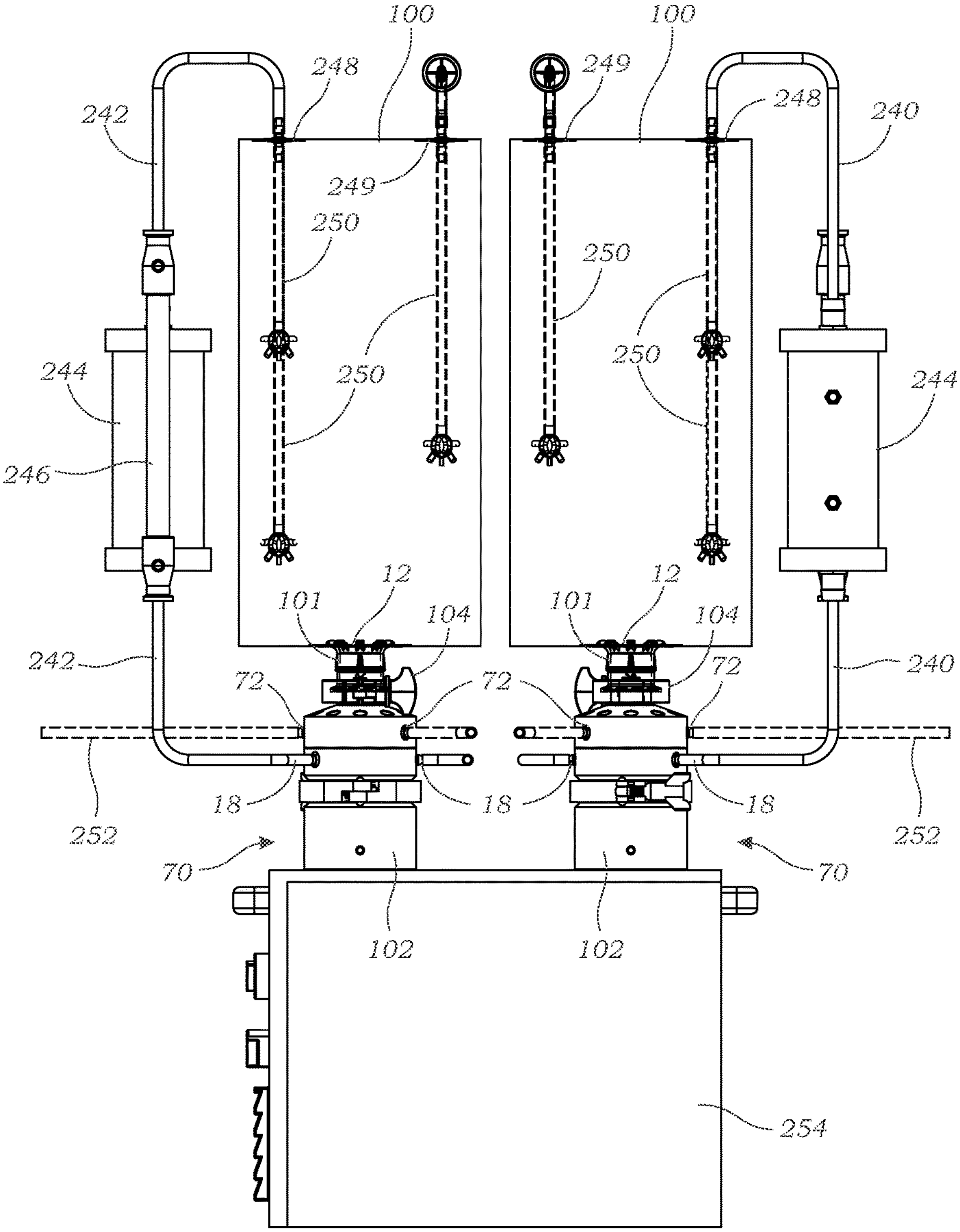
FIG. 16B is a side view of the bioreactor system of FIG. 16A.

FIGS. 16A, 16B, 17A-17C illustrate embodiments in which the pump/mixer 70 is used in connection with a container or vessel 100 used as a bioreactor (these may include flexible bags as illustrated or other rigid containers as explained herein). The pump/mixer 70 is coupled to each container or vessel 100 via a port or coupler 101 as seen in FIG. 16B. Of course, it should be appreciated that the pump/mixer 70 may by secured to the container or vessel 100 via different couplings or even integrated directly into the container or vessel 100. For example, the pump/mixer 70 may be welded to or thermally/chemically bonded to the container or vessel 100. Regardless of the mode of connection, the main inlet 12 of the pump/mixer 70 is in fluid communication with the interior of the container or vessel 100.

The bioreactor may be used to grow, culture, or maintain live cells or other organisms. FIGS. 16A and 16B illustrates two containers or vessels 100 (i.e., two bioreactors) each coupled to their own respective pump/mixer 70. Fluid from the container or vessel 100 enters the main inlet 12 of the pump/mixer 70 as explained herein previously. Each pump/mixer 70 includes multiple outlets 18, some of which, lead to fluid-carrying conduits or lines 240, 242 that ultimately return to the container or vessel 100. As seen in FIGS. 16A and 16B, fluid conduit or line 240 includes a gas transfer unit 244 interposed in the flow path and is used to gas transfer and/or exchange. Fluid conduit or line 242 includes a filter unit 246 interposed in the flow path and is used for filtration. After passing through gas transfer unit 244 and filter unit 246, the respective fluid conduits or lines 240, 242 return flow to the container or vessel 100 via ports 248. In one preferred embodiment, the ports 248 are located in the top of the container or vessel 100. In this regard, the ports 248 are located above the fluid level contained in the container or vessel 100 which is advantageous as it avoids possible leaks. Each port 248 is connected to respective outlet lines 250 that terminate at various depths or locations within the container or vessel 100. Additional ports 249 may be provided on the container or vessel 100 that are used to input fluids, gases, or even solids into the interior of the container or vessel 100.

Each pump/mixer 70 includes one or more additional inlets 72 that are used to introduce fluids for mixing into the pump/mixer 70 via conduit or line 252. The inlet(s) 72 may be used to adding buffers, wash fluid, other fluids, chemicals, reagents, special cell nutrients, drugs or therapeutics, and the like as needed by the particular process taking place in the bioreactor. The pump/mixer 70 may include additional outlets 18 that are used to evacuate the contents of the container or vessel 100 or for transport to another downstream processing operation. While FIGS. 16A and 16B illustrate a gas transfer unit 244 and a filter unit 246, it should be understood that other operations may be optionally integrated into fluid conduits/lines 240, 242 (in some embodiment these may be omitted and lines 240, 242 just serve as return lines). As seen in FIGS. 16A and 16B, the pump/mixers 70 are supported by a housing or base 254. The housing or base 254 contains the motors or drive units 102 and electronics used to power and drive the pump/mixers 70.

Figure 17A:
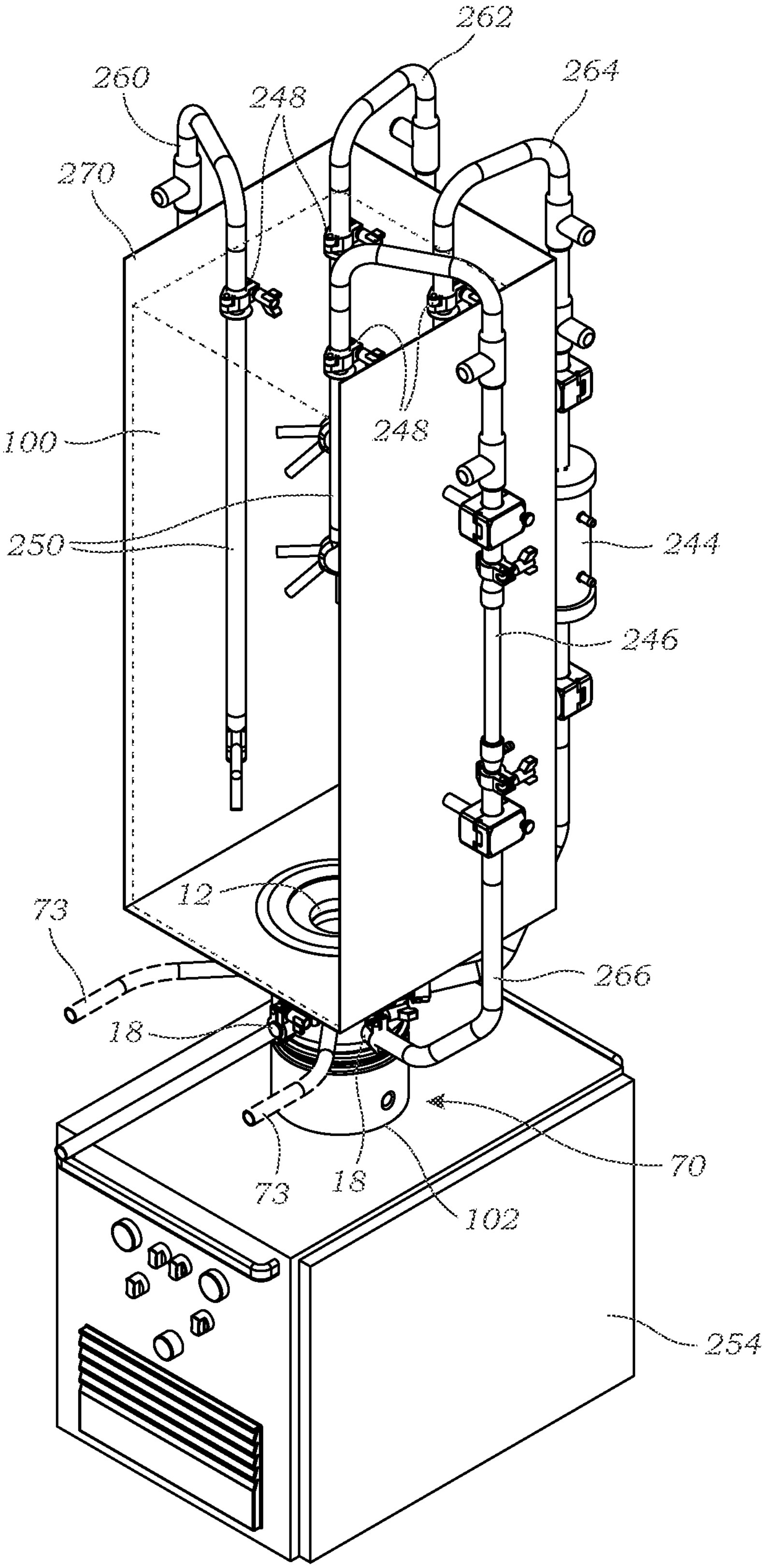
FIG. 17A illustrates a perspective view of an embodiment of a pump/mixer used in another bioreactor application. A single bioreactor vessel or container (e.g., flexible bag) is illustrated along with the coupled pump/mixer device. The flexible bag is held within a frame (with one wall omitted for clarity).
Figure 17B:
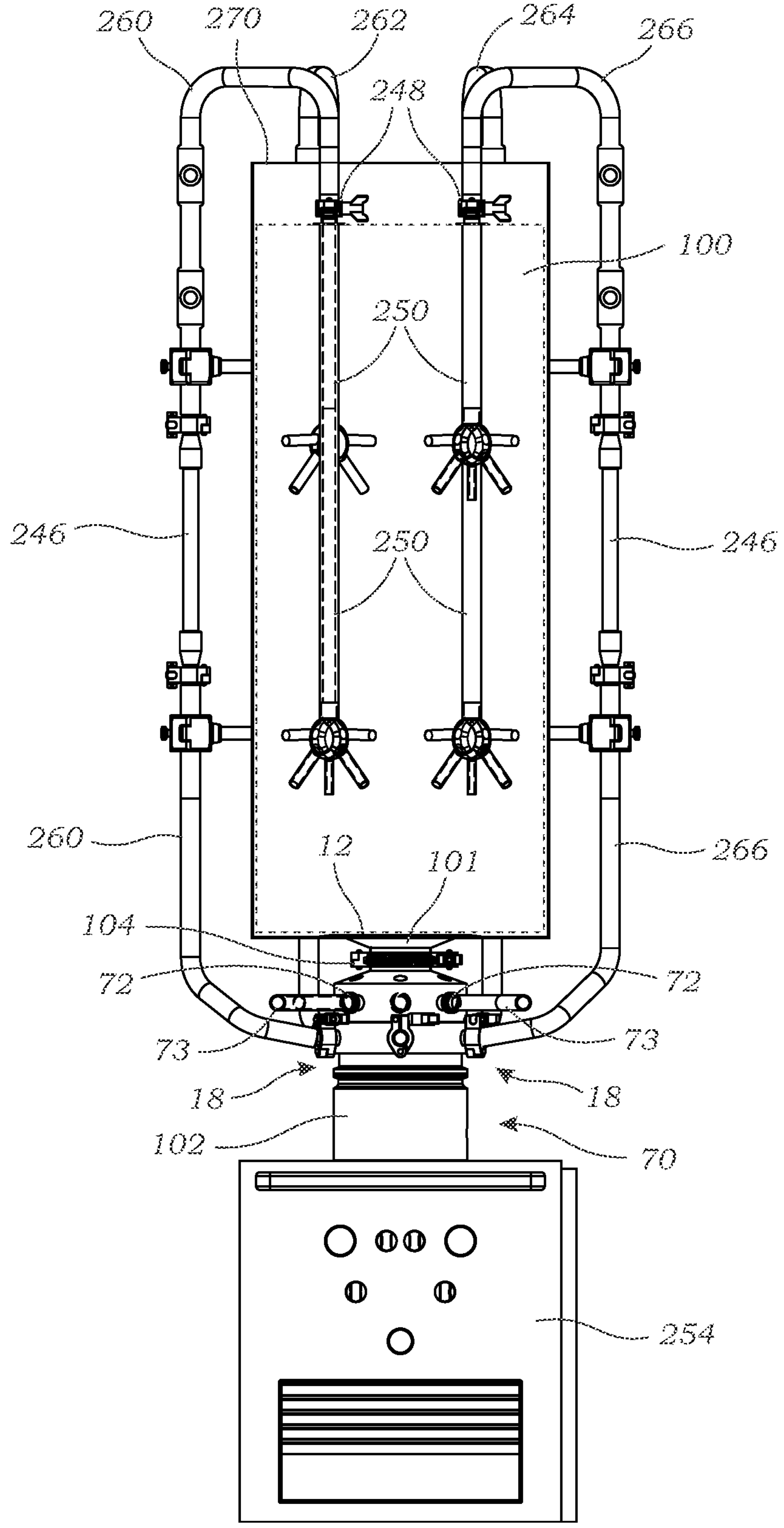
FIG. 17B is a front view of the bioreactor system of FIG. 17A.
Figure 17C:
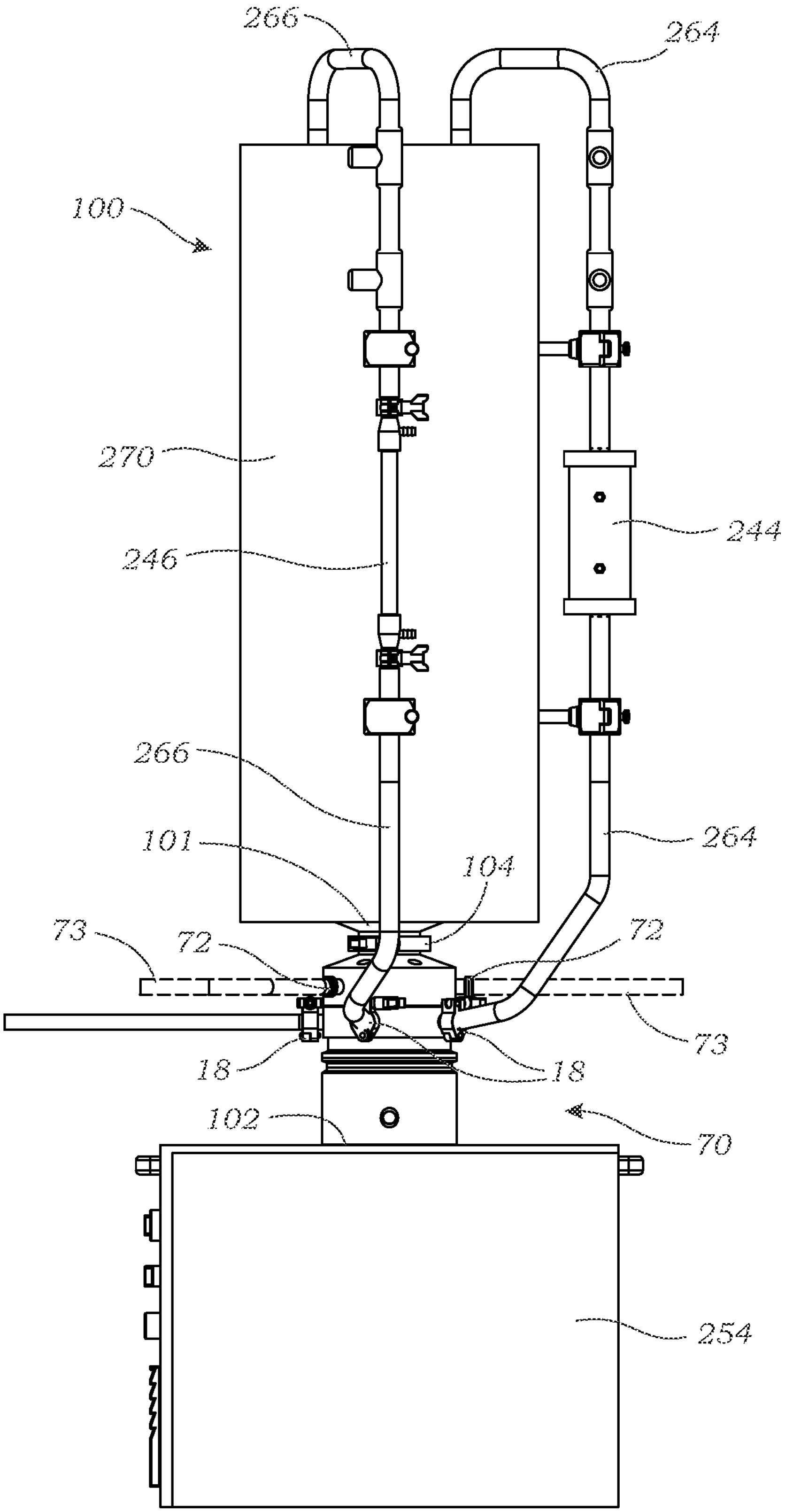
FIG. 17C is a side view of the bioreactor system of FIG. 17A.

FIGS. 17A-17C illustrate another embodiment of a container or vessel 100 that is used as a bioreactor. This embodiment illustrates a pump/mixer 70 with one or more inlets 72 and multiple outlets 18 secured to the bottom of the container or vessel 100 via a port or coupler 101 using a sanitary clamp 104 (other attachment scheme). The main inlet 12 to the pump/mixer 70 is located at the bottom of the container or vessel 100. In this embodiment, there are five (5) outlets with four (4) of the outlets leading to respective fluid-carrying conduits or lines 260, 262, 264, 266 that eventually return fluid to the container or vessel 100. The additional inlets 72 are coupled to fluid-carrying tubing or conduits 73 that carry fluid that enters the inlets 72 of the pump/mixer 70 for mixing with the fluid that enters the main inlet 12. As with the embodiment of FIGS. 16A, 16B, one or more processing units may be interposed in the conduits or lines 260, 262, 264, 266. These may include, for example, a gas transfer unit 244, a filter unit 246, or the like. Ports 248 are provided at the top of the container or vessel 100 that are connected to respective outlets lines 250 that terminate at various locations with the container or vessel 100. In this particular embodiment, the container or vessel 100, which is a flexible bag, is held within a frame 270 that includes a bottom surface and side walls to hold the flexible bag (one wall is omitted for clarity purposes). Of course, other ways of holding the container or vessel 100 are contemplated. For example, the flexible bag may be secured within a dolly or carrier or held in place with hooks, retainers, or the like. As with the prior embodiment, a housing or base 254 supports the pump/mixer 70 and contains the motor or drive unit 102 and electronics used to power and drive the pump/mixer 70.

One advantage of the bioreactor embodiments of FIGS. 16A-16B, 17A-17C is that mixing takes place inside the pump/mixer 70 and is then transferred into the container or vessel 100 via ports 248 located at the top of the container. These ports 248 are located above the fluid line to thereby reduce risk of leaks and/or contamination. In addition, this reduces the total number of ports as the return lines 240, 242, 260, 262, 264, 266 are used to carry mixed fluid in addition can be used to recirculate fluid within the bioreactor. Mixing feeds can be directly input to the pump/mixer 70 and there is no need for a separate inlet port to the container or vessel 100 and no need for agitators and/or mixers within the container or vessel 100. Conditions inside the container or vessel 100 can be tuned as needed by controlling the input feeds to the additional inlets 72 and also running the bioreactor contents through one or more external processing units. For example, these processing units (e.g., a gas transfer unit 244) can perform gas exchange similar to the way a person's lungs operate to exchange oxygen and carbon dioxide during respiration. Likewise, a filter unit 246 may eliminate waste products and operate similar to a person's liver or kidneys. At the same time, the input conditions to the container or vessel 100 can be adjusted or tuned by adjusting the compositions and/or flow rates of input fluids to the interior of the container or vessel 100 (e.g., to adjust or tune the growth media present therein). It should be appreciated that the specific bioreactor setups illustrated in FIGS. 16A-16B and 17A-17C are exemplary. Different bioreactor setups appropriate for a particular application(s) can be used that incorporate the pump/mixer(s) 70.

The pumps 10 and/or pump/mixers 70 may also be used in industrial applications. For example, the pump 10 and/or pump/mixers 70 may be used with Intermediate Bulk Containers (IBC). IBCs are used to storing and transporting bulk quantities of materials including fluids or liquids. The contents of IBCs serving as the container or vessel 100 may be pumped and/or mixed using the pumps 10 and/or pump/mixers 70. The pumps 10 and/or pump/mixers 70 may also be used in food manufacturing applications to mix and/or pump food ingredients, additives, or the like. While the pumps 10 and/or pump/mixers 70 are principally designed to operate on fluids or liquids that are contained in the container or vessel 100 it should be appreciated that some applications (such as food) may involve some solid materials or contents that may be viscous or have fluid-like properties. The pumps 10 and/or pump/mixers 70 may also be used in semiconductor or other industrial applications.

While embodiments of the present invention have been shown and described, various modifications may be made without departing from the scope of the present invention. For example, rather than use a nutating disk/ring or wobble plate to actuate the diaphragms 48, an alternative driving mechanism may include servo motors or electronic/magnetic actuators that are used to sequentially actuate the diaphragms 48 to achieve similar pumping action. Moreover, it should be appreciated that aspects of one embodiment may be utilized in other embodiments described herein. Thus, features of one embodiment may be substituted or used in other embodiments. A pump/mixer 70 may also be used as a pump 10 if the inlets 72 are closed (e.g., by using valve(s) or the like) or plugged. In addition, while the pumps 10 and pump/mixers 70 illustrated herein are oriented vertically, it should be appreciated that some configurations may include the pumps 10 and pump/mixers oriented in a horizontal configuration. In this embodiment, an elbow or 90-degree conduit/port or coupler 101 may secure the container or vessel 100 to the pump 10 or pump/mixer 70. In addition, while the embodiments described herein have largely been described being used in the context of a bioprocess or pharmaceutical operation, the embodiments are not limited to those applications. For example, the concepts and embodiments described herein may be applied to high purity chemical systems or in other industries. The invention, therefore, should not be limited except to the following claims and their equivalents.

What is claimed is:

1. A pump/mixer device comprising:

a main inlet located at a top or upper region of a pump/mixer, the main inlet configured to be secured to or integrated into a bottom of a vessel or container containing a liquid therein;

an outer chamber disposed in the pump/mixer and fluidically connected to the main inlet;

a plurality of lower chambers disposed in the pump/mixer beneath the outer chamber and fluidically connected to the outer chamber by respective check valves interposed between the outer chamber and the plurality of lower chambers, each lower chamber configured to receive the liquid from the outer chamber via the respective check valves;

a central chamber disposed in the pump/mixer, the central chamber fluidically connected to the plurality of lower chambers with respective check valves interposed between the central chamber and the plurality of lower chambers, the central chamber configured to receive the liquid from the plurality of lower chambers via the respective check valves interposed between the central chamber and the plurality of lower chambers;

at least one outlet fluidically connected to the central chamber;

one or more additional liquid inlets fluidically coupled to the central chamber via respective inlet check valve(s) and coupled to respective liquid sources; and a moveable diaphragm disposed in each of the plurality of lower chambers, the moveable diaphragms interfacing with a respective actuating element driven by a nutating disk or wobble plate operatively coupled to a motor or drive unit, wherein actuation causes each of the moveable diaphragms to move in opposing directions; and wherein the outer chamber circumscribes the central chamber as an annulus.

2. The pump/mixer device of claim 1, wherein the pump/mixer comprises a plurality of outlets fluidically connected to the central chamber.

3. The pump/mixer device of claim 1, wherein the pump/mixer comprises a plurality of inlets fluidically coupled to the central chamber via respective inlet check valve(s) and coupled to respective liquid sources.

4. The pump/mixer device of claim 1, wherein the nutating disk or wobble plate is coupled to the motor or drive unit by an eccentric drive shaft.

5. The pump/mixer device of claim 1, wherein the number of moveable diaphragms comprises an odd number of diaphragms.

6. The pump/mixer device of claim 1, wherein the number of moveable diaphragms comprises an even number of diaphragms.

7. The pump/mixer device of claim 1, wherein the one or more additional inlets are removable from the pump/mixer device.

8. The pump/mixer device of claim 1, wherein the one or more outlets are removable from the pump/mixer device.

9. The pump/mixer device of claim 1, wherein the one or more additional inlets are fluidically connected to a flow passage comprising a jet structure formed therein adjacent to the respective inlet check valve(s).

10. The pump/mixer device of claim 1, further comprising a vortex breaker that extends or projects from the main inlet and includes a plurality of fins formed about a periphery thereof.

11. The pump/mixer device of claim 1, wherein the pump/mixer device is removable from the vessel or container.

12. The pump/mixer device of claim 1, comprising an upper housing containing the main inlet, a central housing containing the plurality of lower chambers and the central chamber, and a bottom housing or plate containing the moveable diaphragms and secured to the central housing.

13. A method of operating the pump/mixer device of claim 1 comprising:

driving the motor or drive unit to actuate the nutating disk or wobble plate;

inputting a first liquid fluid from the vessel or container into the main inlet of the pump/mixer;

inputting a second or additional liquid fluid(s) into the pump/mixer via the one or more additional inlets;

mixing the first liquid fluid and the second or additional liquid fluid(s) in the central chamber of the pump/mixer; and outputting the mixed liquid fluid via the at least one outlet.

14. The method of claim 13, wherein the second or additional liquid fluid(s) are input into the pump/mixer by one or more additional pumps.

15. The method of claim 13, wherein the one or more additional inlets contain or are coupled to respective separate valves, and one or more of the respective separate valves are actuated to initiate and/or stop flow of the second or additional liquid fluid(s) into the pump/mixer device.

16. The method of claim 13, wherein the second or additional liquid fluid(s) comprises a liquid buffer fluid or liquid concentrated fluid.

* * * * *